(12) United States Patent
Askarianabyaneh et al.

(10) Patent No.: US 10,879,813 B2
(45) Date of Patent: Dec. 29, 2020

(54) BRIDGELESS SINGLE-STAGE AC/DC CONVERTER

(71) Applicant: Delta-Q Technologies Corp., Burnaby (CA)

(72) Inventors: Iman Askarianabyaneh, Calgary (CA); Nicholas Adam Dohmeier, Coquitlam (CA); Majid Pahlevaninezhad, Kingston (CA); Christopher Jon Botting, Vancouver (CA)

(73) Assignee: Delta-Q Technologies Corp., Burnaby (CA)

( * ) Notice: Subject to any disclaimer, the term of this patent is extended or adjusted under 35 U.S.C. 154(b) by 0 days.

(21) Appl. No.: 16/576,606

(22) Filed: Sep. 19, 2019

(65) Prior Publication Data
US 2020/0099311 A1 Mar. 26, 2020

Related U.S. Application Data

(60) Provisional application No. 62/734,595, filed on Sep. 21, 2018.

(51) Int. Cl.
*H02M 3/335* (2006.01)
*H02M 7/217* (2006.01)
*H02M 1/42* (2007.01)

(52) U.S. Cl.
CPC ......... *H02M 7/217* (2013.01); *H02M 1/4233* (2013.01); *H02M 3/33507* (2013.01)

(58) Field of Classification Search
CPC .... H02M 7/217; H02M 3/33507; H02M 1/42; H02M 1/4233; H02M 1/4241; H02M 1/425; H02M 1/4258
See application file for complete search history.

(56) References Cited

U.S. PATENT DOCUMENTS 3,938,024 A 2/1976 Clarke
4,412,277 A 10/1983 Mitchell
(Continued)

FOREIGN PATENT DOCUMENTS

| CA | 2 806 870 A1 | 4/2014 |
| CN | 102510610 A | 6/2012 |
| KR | 1020160011497 A | 2/2016 |
| WO | 2010/025596 A1 | 3/2010 |

OTHER PUBLICATIONS

Chen et al., "Digital Control for Improved Efficiency and Reduced Harmonic Distortion Over Wide Load Range in Boost PFC Rectifiers," *IEEE Transactions on Power Electronics* 25(10):2683-2692, Oct. 2010.

(Continued)

*Primary Examiner* — Gary L Laxton
(74) *Attorney, Agent, or Firm* — Seed Intellectual Property Law Group LLP

(57) ABSTRACT

A single-stage AC/DC converter includes a boost PFC AC/DC converter and a half-bridge split-capacitor DC/DC converter. The boost PFC AC/DC converter includes a boost inductor, and the half-bridge split-capacitor DC/DC converter includes an inductor in series with a primary winding of a transformer. A method of operation of a single-stage AC/DC converter that includes a boost PFC AC/DC converter and a half-bridge split-capacitor DC/DC converter includes modulating a switching frequency of at least one switch. The method may further include maintaining a constant duty cycle, for example a duty cycle of 0.5. An implementation of the boost inductor in a boost PFC AC/DC converter of a single-stage AC/DC converter includes a variable boost inductor, such as two inductors of approximately equal inductance, and a boost inductor switching circuit, such as two single-pole, double-throw relays.

21 Claims, 19 Drawing Sheets

(56) References Cited

U.S. PATENT DOCUMENTS

| | | | |
|---|---|---|---|
| 4,559,590 A | 12/1985 | Davidson | |
| 4,885,675 A | 12/1989 | Henze et al. | |
| 5,001,620 A | 3/1991 | Smith | |
| 5,034,871 A | 7/1991 | Okamoto et al. | |
| 5,065,278 A | 11/1991 | Schultz | |
| 5,077,486 A | 12/1991 | Marson et al. | |
| 5,355,300 A | 10/1994 | Zinn | |
| 5,490,057 A | 2/1996 | Vinciarelli et al. | |
| 5,602,462 A | 2/1997 | Stich et al. | |
| 5,798,630 A * | 8/1998 | Sugimori | H02J 7/022 |
| | | | 320/137 |
| 6,076,594 A | 6/2000 | Kuo | |
| 6,307,747 B1 | 10/2001 | Farnsworth et al. | |
| 6,320,772 B1 | 11/2001 | Doyama et al. | |
| 6,462,966 B1 | 10/2002 | Leung et al. | |
| 6,650,559 B1 | 11/2003 | Okamoto et al. | |
| 6,671,172 B2 | 12/2003 | Carter et al. | |
| 6,736,195 B2 | 5/2004 | Busch et al. | |
| 6,809,678 B2 | 10/2004 | Vera et al. | |
| 6,841,979 B2 | 1/2005 | Berson et al. | |
| 6,847,195 B2 | 1/2005 | Chen | |
| 6,862,201 B2 | 3/2005 | Hodge, Jr. | |
| 7,116,090 B1 | 10/2006 | Yang et al. | |
| 7,198,094 B2 | 4/2007 | Barsun et al. | |
| 7,365,987 B2 | 4/2008 | Jeong | |
| 7,535,716 B2 | 5/2009 | Fischer et al. | |
| 7,616,455 B2 | 11/2009 | Cameron et al. | |
| 7,983,043 B2 | 7/2011 | Xu et al. | |
| 8,546,974 B2 | 10/2013 | Foxall et al. | |
| 8,552,695 B2 | 10/2013 | Stracquadaini | |
| 8,598,737 B2 | 12/2013 | Foxall et al. | |
| 8,803,489 B2 | 8/2014 | Li et al. | |
| 8,861,238 B2 | 10/2014 | Huang et al. | |
| 8,937,469 B2 | 1/2015 | Clark et al. | |
| 9,028,096 B2 | 5/2015 | Verdes et al. | |
| 9,490,694 B2 | 11/2016 | Alam | |
| 2002/0149951 A1 | 10/2002 | Leung et al. | |
| 2004/0240182 A1 | 12/2004 | Shah | |
| 2005/0061480 A1 | 3/2005 | Carter et al. | |
| 2005/0105311 A1 | 9/2005 | Soldano | |
| 2007/0014089 A1 | 1/2007 | Huang | |
| 2007/0131387 A1 | 6/2007 | Kawabata et al. | |
| 2007/0133233 A1 | 6/2007 | Cameron et al. | |
| 2008/0002444 A1 | 1/2008 | Shekhawat et al. | |
| 2008/0295993 A1 | 12/2008 | Chen et al. | |
| 2010/0110593 A1 | 5/2010 | Kim et al. | |
| 2010/0165683 A1 | 7/2010 | Sugawara | |
| 2010/0259240 A1 | 10/2010 | Cuk | |
| 2011/0110127 A1 | 5/2011 | Lee | |
| 2011/0211377 A1 | 9/2011 | Uno | |
| 2011/0286216 A1 | 11/2011 | Araman | |
| 2011/0292703 A1 | 12/2011 | Cuk | |
| 2012/0069615 A1 | 3/2012 | Tomioka | |
| 2012/0249102 A1 | 10/2012 | Cuk | |
| 2012/0256606 A1 | 10/2012 | Van Den Broeke | |
| 2013/0051102 A1 | 2/2013 | Huang et al. | |
| 2013/0235631 A1 | 9/2013 | Pahlevaninezhad et al. | |
| 2014/0056045 A1 | 2/2014 | Yan et al. | |
| 2014/0097808 A1 | 4/2014 | Clark et al. | |
| 2014/0268952 A1 | 9/2014 | Tong | |
| 2015/0171734 A1 | 6/2015 | Yu et al. | |
| 2015/0263605 A1 | 9/2015 | Alam | |
| 2016/0056730 A1 | 2/2016 | Yan et al. | |
| 2016/0099660 A1 | 4/2016 | Khaligh et al. | |
| 2019/0036366 A1 | 1/2019 | Dohmeier et al. | |
| 2019/0326813 A1 * | 10/2019 | Li | H02M 3/335 |
| 2020/0014245 A1 * | 1/2020 | Costinett | H02M 7/217 |

OTHER PUBLICATIONS

Cheng et al, "A Novel Single-Stage High-Power-Factor LED Street-Lighting Driver with Coupled Inductors," *IEEE Power Electronics Lab*. Dept. of Electrical Engineering, I-Shou University, Taiwan, R.O.C. 2013.

Clark, "Digital Control Techniques for Power Quality Improvements in Power Factor Correction Applications," Master's Thesis, University of British Columbia, Jul. 2012, 114 pages.

De Gussemé et al., "Digitally Controlled Boost Power-Factor-Correction Converts Operating in Both Continuous and Discontinuous Conduction Mode," *IEEE Transactions on Industrial Electronics* 52(1):88-97, Feb. 2005.

De Gussemé et al., "Input-Current Distortion of CCM Boost PFC Converts Operated in DCM," *IEEE Transactions on Industrial Electronics* 54(2):858-865, Apr. 2007.

De Gussemé et al., "Sample Correction for Digitally Controlled Boost PFC Converters Operating in both CCM and DCM," *Eighteenth Annual IEEE Applied Power Electronics Conference and Exposition* 1:389-395, Feb. 9-13, 2003.

De Souza et al., "A New ZVS-PWM Unity Power Factor Rectifier with Reduced Conduction Losses," *IEEE Transactions on Power Electronics* 10(6):746-752, Nov. 1995.

De Souza et al., "High Power Factor Rectifier with Reduced Conduction and Commutation Losses," *21st International Telecommunication Energy Conference*, Copenhagen, Jun. 6-9, 1999, 5 pages.

Delta-Q Technologies Corp., "Delta-Q Technologies Introduces New Lithium-Specific Battery Charger at ProMAT 2017," published Mar. 27, 2017, retrieved from http://www.prnewswire.com/news-releases/delta-q-technologoes-introduces-new-lithium-specific-battery-charger-at-promat-2017-617167523.htm on Jun. 1, 2017, 3 pages.

Deng et al., "Design Methodology of LLC Resonant Converters for Electric Vehicle Battery Chargers," *IEEE Transactions on Vehicular Technology* 63(4):1581-1592, May 2014.

Dixon, "Average Current Mode Control of Switching Power Supplies," Unitrode Application Note U-140, pp. 3-356-3-369, 1990. (14 pages).

Dixon, "Average Current Mode Control of Switching Power Supplies—Topic 5," Unitrode Corporation, pp. 5-1-5-14, 2001. (16 pages).

Erickson et al., Fundamentals of Power Electronics, Second Edition, Kluwer Academic Publishers, Secaucus, NJ, 2001, 12 pages, Table of Contents.

Fairchild Semiconductor, "FAN7930: Critical Conduction Mode PFC Controller," Apr. 2010, 22 pages.

Hu Y. et al., "Single-Stage, Universal-Input AC/DC LED Driver With Current-Controlled Variable PFC Boost Inductor", *IEEE Transactions on Power Electronics* 27(3):1579-1588, Mar. 2012.

Huber et al., "Performance Evaluation of Bridgeless PFC Boost Rectifiers," *IEEE Transactions on Power Electronics* 23(3):1381-1390, May 2008.

Hwang et al., "Seamless Boost Converter Control in Critical Boundary Condition for Fuel Cell Power Conditioning System," *IEEE Energy Conversion Congress and Exposition*, Sep. 17-22, 2011, pp. 3641-3648.

Hwang et al., "Seamless Boost Converter Control Under the Critical Boundary Condition for a Fuel Cell Power Conditioning System," *IEEE Transactions on Power Electronics* 27(8):3616-3626, Aug. 2012.

Liou et al., "Design and Implementation of a Boost Power Factor Correction Stage Operated in Mixed-Condition Mode," *International Conference of Electric Information and Control Engineering (ICEICE)*, Apr. 15-17, 2011, pp. 2069-2072.

Maksimović et al., "Impact of Digital Control in Power Electronics," Proceedings of 2004 International Symposium on Power Semiconductor Devices & ICs, Kitakyushu, pp. 13-22, 2004.

Martinez et al., "A High-Performance Single-Phase Rectifier with Input Power Factor Correction," *IEEE Transactions on Power Electronics* 11(2):311-317, Mar. 1996.

Marvi et al., "A Fully ZVS Critical Conduction Mode Boost PFC," *IEEE Transactions on Power Electronics* 27(4):1958-1965, Apr. 2012.

Moon et al., "Accurate Mode Boundary Detection in Digitally Controlled Boost Power Factor Correction Rectifiers," *IEEE Energy Conversion Congress and Exposition (ECCE)*, Sep. 12-16, 2010, pp. 1212-1217.

Moon et al., "Autotuning of Digitally Controlled Boost Power Factor Correction Rectifiers," *IEEE Transactions on Power Electronics* 26(10):3006-3018, Oct. 2011.

(56) References Cited

OTHER PUBLICATIONS

Musavi et al., "A Phase-Shifted Gating Technique With Simplified Current Sensing for the Semi-Bridgeless AC-DC Converter," *IEEE Transactions on Vehicular Technology* 62(4):1568-1576, May 2013.
Park et al., "Design on Topologies for High Efficiency Two-Stage AC-DC Converter," *IEEE 7th International Power Electronics and Motion Control Conference*—ECCE Asia Jun. 2-5, 2012, Harbin, China.
Roggia et al., "Digital Control System Applied to a PFC Boost Converter Operating in Mixed Conduction Mode," Brazilian Power Electronics Conference (COBEP), Sep. 2-Oct. 1, 2009, pp. 698-704.
Salmon, "Circuit topologies for pwm boost rectifiers operated from 1-phase and 3-phase ac supplies and using either single or split dc rail voltage outputs," 10th Annual Applied Power Electronics Conference and Exposition, Dallas, TX, Mar. 5-9, 1995, vol. 1, pp. 473-479.
Salmon, "Circuit Topologies for Single-Phase Voltage-Doubler Boost Rectifiers," *IEEE Transactions on Power Electronics* 8(4):521-529, Oct. 1993.
Sebastián et al., "The Determination of the Boundaries Between Continuous and Discontinuous Conduction Modes in PWM DC-to-DC Converters Used as Power Factor Preregulators," *IEEE Transactions on Power Electronics* 10(5):574-582, Sep. 1995.
Su et al., "An Interleaved Totem-Pole Boost Bridgeless Rectifier With Reduced Reverse-Recovery Problems for Power Factor Correction," *IEEE Transactions on Power Electronics* 25(6):1406-1415, Jun. 2010.
Tollik et al., "Comparative Analysis of 1-Phase Active Power Factor Correction Topologies," 14th International Telecommunications Energy Conference, Washington, DC, Oct. 4-8, 1992, pp. 517-523.
Tsai et al., "A Family of Zero-Voltage-Transition Bridgeless Power-Factor-Correction Circuits With a Zero-Current-Switching Auxiliary Switch," *IEEE Transactions on Industrial Electronics* 58(5):1848-1855, May 2011.
Van de Sype et al., "Duty-Ratio Feedforward for Digitally Controlled Boost PFC Converters," *IEEE Transactions on Industrial Electronics* 52(1):108-115, Feb. 2005.
Wang, "A New Single-Phase ZCS-PWM Boost Rectifier With High Power Factor and Low Conduction Losses," *IEEE Transactions on Industrial Electronics* 53(2):500-510, Apr. 2006.

* cited by examiner

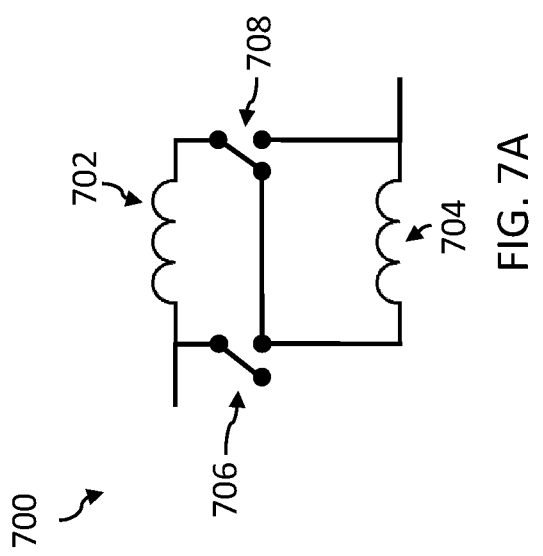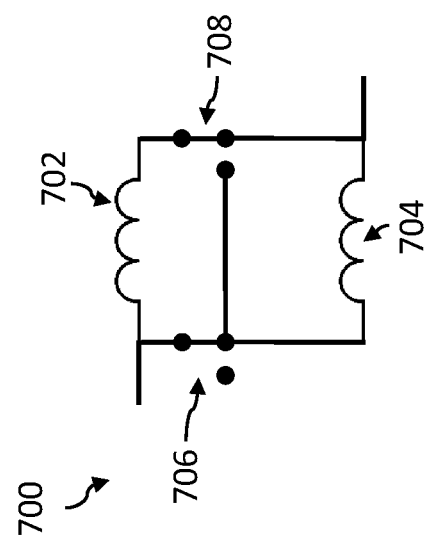

BRIDGELESS SINGLE-STAGE AC/DC CONVERTER

TECHNICAL FIELD

The present application relates to power supplies, and particular implementations provide on-board and off-board power conversion for vehicles and machinery powered by a DC current source (e.g., battery, super-capacitor).

BACKGROUND

Description of the Related Art

A battery charger is a device that, in use, controls the storage of energy in a battery (e.g., secondary or rechargeable battery cells) by controlling a charging current to the battery. Battery chargers are used in a variety of applications including, for instance, electric vehicles (e.g., cars, trucks, golf carts, self-propelled vehicles, and the like), and machinery (e.g., floor cleaning machines, aerial work platforms, appliances, and signage).

Battery chargers for electric vehicles can be rated according to the specifications of the vehicle and the specifications of the battery to be charged. Battery chargers may, for example, be used to charge a traction battery pack of a vehicle. In some cases, an on-board battery charger is carried by the vehicle. In other cases, a charging station or off-board battery charger may be used to charge the battery when the vehicle is docked or plugged in to the charging station or off-board charger.

Some battery chargers have electrical isolation between an AC voltage source and the battery. Other battery chargers are non-isolated.

A DC/DC converter is a power converter that in operation converts a direct current (DC) voltage at a first voltage level from a source to a DC voltage at another voltage level, e.g. from 200 V DC to 48 V DC. In some cases, a DC/DC converter is isolated, and a transformer can provide electrical isolation between an input and an output. In some cases, a DC/DC converter is a resonant DC/DC converter.

BRIEF SUMMARY

An apparatus may be summarized as including: a transformer comprising a primary winding and a secondary winding, the primary winding comprising a first end and a second end of the primary winding, and the secondary winding comprising a first end and a second end of the secondary winding; a first AC voltage source input connectable to a first AC input line; a second AC voltage source input connectable to a second AC input line; a first inductor connected between the first AC voltage source input and a central node; a first switch connected between the central node and a first rail node, the first rail node connected to the second end of the primary winding; a first diode oriented to pass current from the first rail node to the central node; a second switch connected between the central node and a second rail node; a second diode oriented to pass current from the central node to the second rail node; a first input rectifier connected between the first rail node and the second AC voltage source input and oriented to pass current from the first rail node to the second AC voltage source input; a second input rectifier connected between the second rail node and the second AC voltage source input and oriented to pass current from the second AC voltage source input to the second rail node; a second inductor connected between the central node and the first end of the primary winding of the transformer; a first capacitor connected between the second rail node and the second end of the primary winding of the transformer; and an output rectifier circuit connected between the secondary winding of the transformer and a load, wherein, in operation, the apparatus delivers a DC current to the load via the output rectifier circuit.

The apparatus may further include a second capacitor connected between the first rail node and the second end of the primary winding of the transformer.

In some implementations, the output rectifier circuit includes a first output rectifier connected between the first end of the secondary winding of the transformer and a third rail node, and oriented to pass current from the first end of the secondary winding of the transformer to the third rail node; and a second output rectifier connected between the second end of the secondary winding of the transformer and the third rail node, and oriented to pass current from the second end of the secondary winding of the transformer to the third rail node, wherein, in operation, the apparatus delivers the DC current to the load via the third rail node. In some implementations, at least one of the first input rectifier, the second input rectifier, the first output rectifier, and the second output rectifier includes one of a diode or a controllable switch. In some implementations, the transformer is a center-tapped transformer.

The first diode may be a body diode of the first switch, and the second diode may be a body diode of the second switch. The first inductor may include a variable inductor having a selectively variable inductance. The variable inductor may include two inductors, and the apparatus may further include: a first inductor switching circuit operatively coupled to the two inductors of the variable inductor, in operation, the first inductor switching circuit selectively couples the two inductors in a parallel configuration or a series configuration to provide two different levels of inductance for the variable inductor. The first inductor switching circuit may include one or more relays, one or more mechanical switches, one or more jumpers, or one or more solid state switches. The apparatus may further include: a control system operatively coupled to the first inductor switching circuit, in operation, the control system controls the first inductor switching circuit to cause the first inductor switching circuit to couple the two inductors of the first inductor in a parallel configuration or a series configuration based at least in part on the voltage of the AC input line. The second inductor may include a leakage inductance of the primary winding of the transformer. The first switch and the second switch may include MOSFETs.

The apparatus may further include: a control system operatively coupled to the first switch and the second switch, in operation, the control system selectively controls the first switch and the second switch by varying at least one of a respective switching frequency or a respective duty cycle of the first switch and the second switch. The control system may modulate the switching frequency of each of the first and second switches and may maintain the duty cycle of the first and second switches at a constant value. The constant value of the duty cycle may be 0.5 (50%). The control system, in operation, may selectively control the first switch and the second switch to provide zero voltage switching (ZVS) operation. The control system, in operation, may receive at least one feedback signal indicative of an output of the apparatus, and may selectively control the first switch and the second switch based at least in part on the at least one received feedback signal. The at least one feedback signal may include exactly one feedback signal. The control system may operate in a Discontinuous Conduction Mode (DCM).

A method of controlling a single-stage AC/DC converter, the AC/DC converter may be summarized as including a boost PFC AC/DC converter and a half-bridge DC/DC converter, the boost PFC AC/DC converter and the half-bridge DC/DC converter sharing a pair of switches, the method including modulating a respective switching frequency of each of the pair of switches.

In some implementations, the half-bridge DC/DC converter is a half-bridge split-capacitor DC/DC converter.

The method may further include maintaining a defined constant duty cycle for each of the pair of switches. Maintaining a defined constant duty cycle may include maintaining a constant duty cycle of approximately 0.5 (50%). At least one of the pair of switches may be a MOSFET switch.

The method may further include: sensing at least one feedback signal, wherein modulating a respective switching frequency of each of the pair of switches may include modulating a respective switching frequency of each of the pair of switches based at least in part on the sensed at least one feedback signal. Sensing at least one feedback signal may include sensing exactly one feedback signal, and modulating a respective switching frequency of each of the pair of switches may include modulating a respective switching frequency of each of the pair of switches based at least in part on the sensed exactly one feedback signal.

The boost inductor of the boost PFC AC/DC converter may have a selectively variable inductance, and the method may further include: selectively varying the inductance of the boost inductor based at least in part on a voltage of an AC input line. The method may further include: sensing the voltage of the AC input line, wherein selectively varying the inductance of the boost inductor based at least in part on a voltage of an AC input line may include selectively varying the inductance of the boost inductor based at least in part on a voltage of the AC input line. The boost inductor of the boost PFC AC/DC converter may include two inductors, and the boost PFC AC/DC converter may include a boost inductor switching circuit operatively coupled to the two inductors, the method may further include: controlling the boost inductor switching circuit to cause the boost inductor switching circuit to couple the two inductors in a parallel configuration or a series configuration based at least in part on a voltage of the AC input line. The method may further include: sensing the voltage of the AC input line, wherein controlling the boost inductor switching circuit may include controlling the boost inductor switching circuit to cause the boost inductor switching circuit to couple the two inductors in a parallel configuration or a series configuration based at least in part on the sensed voltage of the AC input line.

In some implementations, the half bridge DC/DC converter includes an inductance electrically communicatively coupled in series with a primary winding of a transformer.

Further aspects and details of example implementations are set forth in the drawings and following detailed discussion.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIGS. 7A and 7B are schematic diagrams illustrating an example implementation of an input inductor switching circuit according to the present disclosure.

DEFINITION OF TERMS

Figure 1:
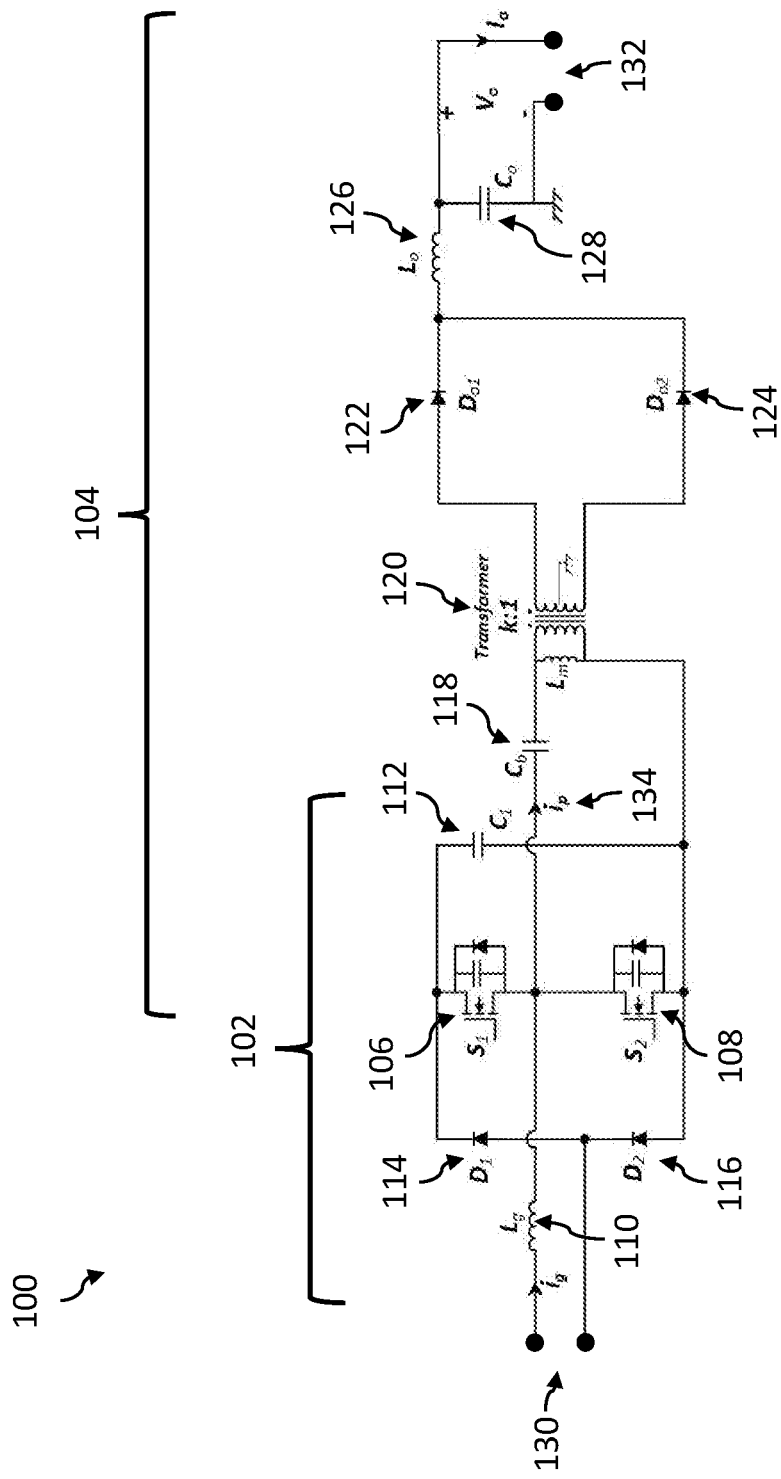
FIG. 1 is a schematic diagram illustrating an example implementation of a system including a single-stage AC/DC converter, according to the prior art.

AC/DC Converter: An electronic circuit or electromechanical device that converts an input of alternating current (AC) to an output of direct current (DC).

Burst Mode: Burst mode is a mode of operation of an AC/DC converter in which lower frequency bursts of high frequency operation are used to achieve a reduced power output. The duty cycle of a burst in burst mode can be used to regulate reduced output power. Operating in burst mode can create a significant output current ripple at the lower frequency burst rate.

DC/DC Converter: An electronic circuit or electromechanical device that converts a source of direct current (DC) from one voltage level to another.

Continuous Conduction Mode (CCM): A mode of operation of an AC/DC converter in which a current does not go to zero during part of a switching cycle.

Discontinuous Conduction Mode (DCM): A mode of operation of an AC/DC converter in which a current goes to zero during part of a switching cycle.

Isolated DC/DC converter: A DC/DC converter in which the input and output are electrically isolated from each other, typically using a transformer.

Line cycle: One cycle of the AC line, for example one cycle of a 50 Hz or 60 Hz cycle of an AC voltage.

MOSFET: A field-effect transistor that has a thin layer of silicon oxide between the gate and the channel.

Pulse-Skipping Mode: Pulse-skipping mode is a mode of operation of an AC/DC converter in which one or more high frequency pulses are skipped in a given period of operation to regulate a reduced power output. Typically, pulses are skipped symmetrically so as to prevent DC currents drawn from an AC supply or passing through a transformer of the AC/DC converter.

Resonant DC/DC converter: A DC/DC converter that includes a network of inductors and capacitors tuned to resonate at a particular frequency. A resonant LLC converter is an example of a resonant DC/DC converter.

Rectifier: A rectifier is an electrical device or circuit that converts alternating current (AC) to direct current (DC).

Split-Capacitor DC/DC converter: A half-bridge DC/DC converter in which a DC input voltage is connected across a pair of switches, the switches connected in series, and also across a pair of capacitors, the capacitors connected in series. The switches can be operated to produce an AC output voltage with respect to a center node of the pair of capacitors. The AC output voltage can be applied to a number of circuit elements such as inductors, transformers, and rectifiers to complete a DC/DC conversion. A benefit of a split-capacitor DC/DC converter is that the pair of capacitors in series with the AC output voltage of the pair of the switches can provide DC voltage blocking.

Terminal: The point at which a conductor from an electrical component in a circuit or apparatus terminates and provides a point of connection to another electrical component or an external circuit. A terminal may be fitted with a connector, for example.

Turns Ratio: The ratio of the number of turns in the primary of a transformer to the number of turns in the secondary.

Wide band gap (WBG) Device: A switching device that includes a semi-conductor material with a wider band gap than silicon (for example, SiC and GaN).

Zero Voltage Switching (ZVS): A switching scheme or topology in which switch turn-on and/or turn-off occurs at zero or near-zero voltage.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power converters, power storage devices, switches and electrical connectors, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are synonymous with "include" and variations thereof, and are to be construed in an open, inclusive sense, (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

An application that requires a well-regulated output voltage and near-unity power factor can employ a two-stage AC/DC power converter. See, for example, Park J. et al., "DESIGN ON TOPOLOGIES FOR HIGH EFFICIENCY TWO-STAGE AC-DC CONVERTER", 2012 IEEE 7$^{th}$ Power Electronics and Motion Control Conference (IPEMC).

A two-stage AC/DC power converter typically includes a pre-regulator followed by a DC/DC converter. The pre-regulator can be a Power Factor Correction (PFC) converter that attempts to ensure high power factor at the input current and that regulates the DC bus voltage. An example of a pre-regulator is a diode bridge rectifier boost PFC converter. A boost PFC AC/DC converter can create a high DC voltage at the DC bus. The DC bus can provide a voltage for a conventional DC/DC converter. The DC/DC converter can be isolated or non-isolated depending on the application. The main objective of the DC/DC converter is to tightly regulate the output current and/or voltage for the load. An example of a DC/DC converter used in a two-stage AC/DC converter is a resonant LLC converter. See, for example, Deng J. et al., "DESIGN METHODOLOGY OF LLC RESONANT CONVERTERS FOR ELECTRIC VEHICLE BATTERY CHARGERS", IEEE Transactions on Vehicular Technology, Vol. 63, No. 4, pp. 1581-1592, May 2014. Advantages of a resonant LLC converter include higher efficiency and lower electromagnetic interference (EMI) than other two-stage AC/DC converters. The advantages are mainly due to the resonant LLC converter's ability to achieve soft switching (also referred to in the present application as zero voltage switching (ZVS)).

Shortcomings of a two-stage AC/DC converter can include low efficiency (owing at least in part to its high number of constituent components, for example more diodes in the current path), low power density, complex thermal management (including management of heat concentrated in the diode bridge rectifier), and/or high cost. A single-stage AC/DC converter can overcome at least some of the shortcomings of a two-stage AC/DC converter by reducing the number of components to save on cost, size, and heat dissipation. A single-stage AC/DC converter can integrate a PFC AC/DC converter stage with a DC/DC converter stage such that operation of the two stages is shared between one or more switches. Generally, the single-stage AC/DC converter includes sharing of one common switch or a pair of common switches. See, for example, Hu Y. et al., "SINGLE-STAGE, UNIVERSAL-INPUT AC/DC LED DRIVER WITH CURRENT-CONTROLLED VARIABLE PFC BOOST INDUCTOR", IEEE Transactions on Power Electronics, Vol. 27, No. 3, pp. 1579-1588, March 2012.

A single-stage AC/DC converter that employs a single switch can suffer from low power efficiency (owing to a hard switching operation of the converter). A single-stage AC/DC converter that employs a single switch can be useful in practice for low power applications (for example, up to 100 W), and less useful for higher power applications.

One approach to increasing power efficiency of a single-stage AC/DC converter is to use two switches and zero voltage switching (ZVS). The approach is less than ideal if a PFC AC/DC converter in the single-stage AC/DC converter employs a full-bridge diode rectifier in its topology. The full-bridge diode rectifier can increase conduction losses, and affect power efficiency of the converter. One option is a bridgeless single-stage AC/DC converter which can reduce conduction losses. In one implementation, a bridgeless single-stage AC/DC converter includes a bridgeless boost rectifier integrated with half-bridge DC/DC resonant and non-resonant converters. The implementation can achieve lower conduction losses owing to the elimination of the diode bridge rectifier, and can achieve lower switching power losses owing to the ZVS operation of the converter. The implementation may be unable, however, to achieve near-unity input power factor while maintaining sufficiently low double-line frequency output current ripple. So, in practice with existing technology, there can be a trade-off between well-regulated output current for a load and a high input power factor.

FIG. 1 is a schematic diagram illustrating an example implementation of a single-stage AC/DC converter 100 in the prior art. Single-stage AC/DC converter 100 includes a boost PFC AC/DC converter 102 and an asymmetrical PWM half-bridge DC/DC converter 104. Switches 106 and 108 (also referred to in FIG. 1 as $S_1$ and $S_2$) are shared between boost PFC AC/DC converter 102 and half-bridge DC/DC converter 104.

Boost PFC AC/DC converter 102 includes a boost inductor 110 (also referred to in FIG. 1 as $L_g$), capacitor 112 (also referred to in FIG. 1 as $C_1$), fast recovery diodes 114 and 116 (also referred to in FIG. 1 as $D_1$ and $D_2$), and switches 106 and 108. In one implementation, switches 106 and 108 are MOSFET switches.

Asymmetrical PWM half-bridge DC/DC converter 104 includes capacitors 112 and 118 (also referred to in FIG. 1 as $C_b$), switches 106 and 108, transformer 120, output diodes 122 and 124 (also referred to in FIG. 1 as $D_{O1}$ and $D_{O2}$), output inductor 126 (also referred to in FIG. 1 as $L_O$), and output filter capacitor 128 (also referred to in FIG. 1 as $C_O$). In one implementation, output diodes 122 and 124 are Schottky diodes.

An input voltage can be provided at input nodes 130. Input voltage at input nodes 130 can be an alternating current (AC) voltage. Input voltage at input nodes 130 can be provided by an AC supply or an AC grid, for example. A DC voltage can be output at nodes 132.

The technology described in the present application includes a novel single-stage AC/DC converter topology, a control method for the single-stage AC/DC converter topology, and a method of varying (e.g., alternating) the boost inductance by using a relay to improve the performance of the converter over a wide input voltage range (for example, for root mean square (RMS) voltages between 85 V and 265 V).

A single-stage AC/DC converter can have lower cost, higher power density, and higher power efficiency than a multi-stage AC/DC converter. The single-stage AC/DC converter described in the present application can provide a more tightly-regulated output current than a conventional single-stage AC/DC converter. For example, the single-stage AC/DC converter described in the present application can: a) provide an output current with negligible double-line frequency ripple current, b) achieve a near-unity Power Factor (PF), and c) achieve Zero Voltage Switching (ZVS) over a wide range of load conditions, which can improve the power efficiency and EMI performance of the converter.

Figure 2A:
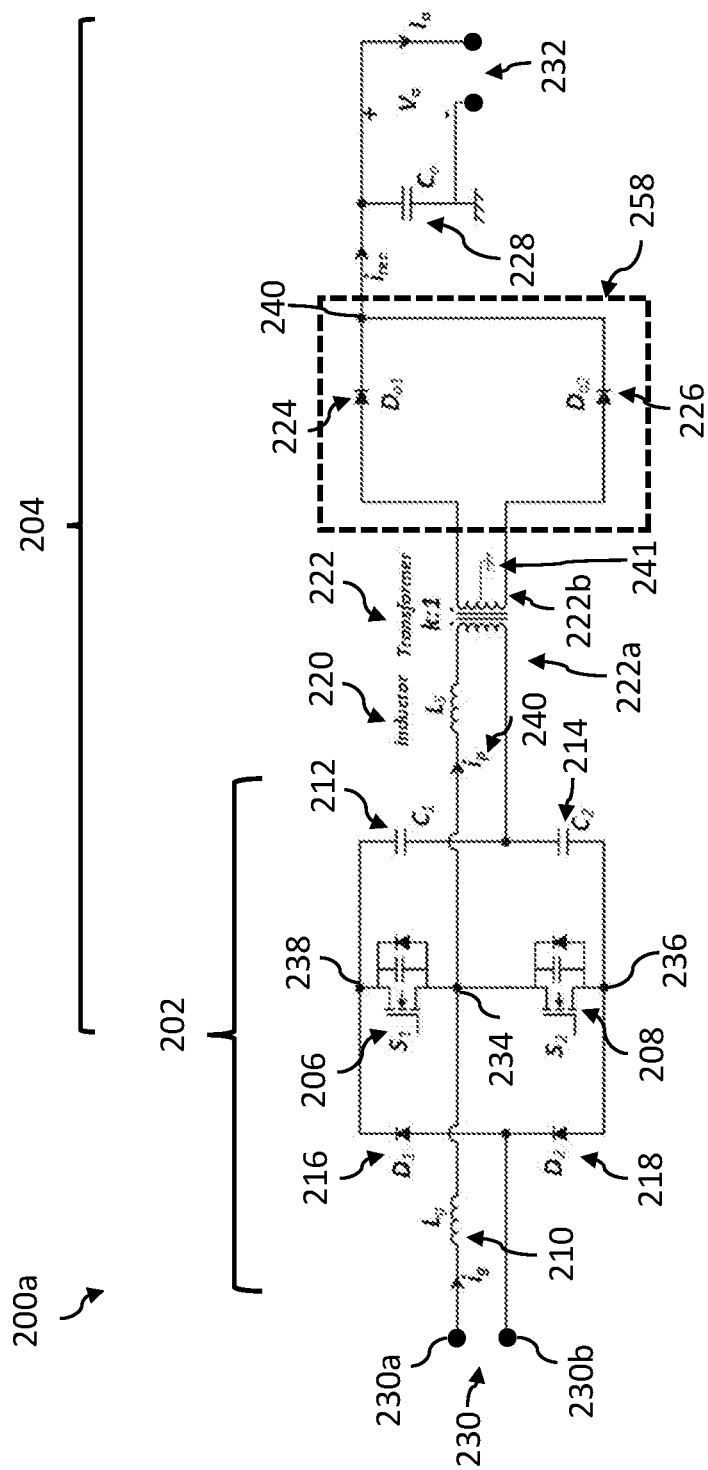
FIG. 2A is a schematic diagram illustrating an example implementation of a single-stage AC/DC converter, according to the systems and methods described in the present application.

FIG. 2A is a schematic diagram illustrating an example implementation of a single-stage AC/DC converter 200a, according to the systems and methods described in the present application. Single-stage AC/DC converter 200a includes a boost PFC AC/DC converter 202 and a half-bridge split-capacitor DC/DC converter 204. Switches 206 and 208 (also referred to in FIG. 2 as $S_1$ and $S_2$) are shared between boost PFC AC/DC converter 202 and half-bridge split-capacitor DC/DC converter 204.

Boost PFC AC/DC converter 202 includes a boost inductor 210 (also referred to in FIG. 2 as $L_g$), storage capacitors 212 and 214 (also referred to in FIG. 2 as $C_1$ and $C_2$), fast recovery diodes 216 and 218 (also referred to in FIG. 2 as $D_1$ and $D_2$), and switches 206 and 208. In one implementation, switches 206 and 208 are MOSFET switches.

Half-bridge split-capacitor DC/DC converter 204 includes storage capacitors 212 and 214, switches 206 and 208, inductor 220 (also referred to in FIG. 2 as $L_s$), transformer 222, output diodes 224 and 226 (also referred to in FIG. 2 as $D_{O1}$ and $D_{O2}$, and output filter capacitor 228 (also referred to in FIG. 2 as $C_O$). In one implementation, output diodes 224 and 226 are Schottky diodes. Inductor 220 is an inductance in series with a primary winding 222a of transformer 222.

In some implementations, the transformer secondary output can be a full-wave rectifier with a center-tapped secondary as illustrated in FIG. 2A, for example. In other implementations, the transformer secondary output can be a full-wave bridge rectifier with a non-center-tapped secondary. This may be advantageous for an application with a higher output voltage, such as a ~400 V electric vehicle battery charger.

Figure 2B:
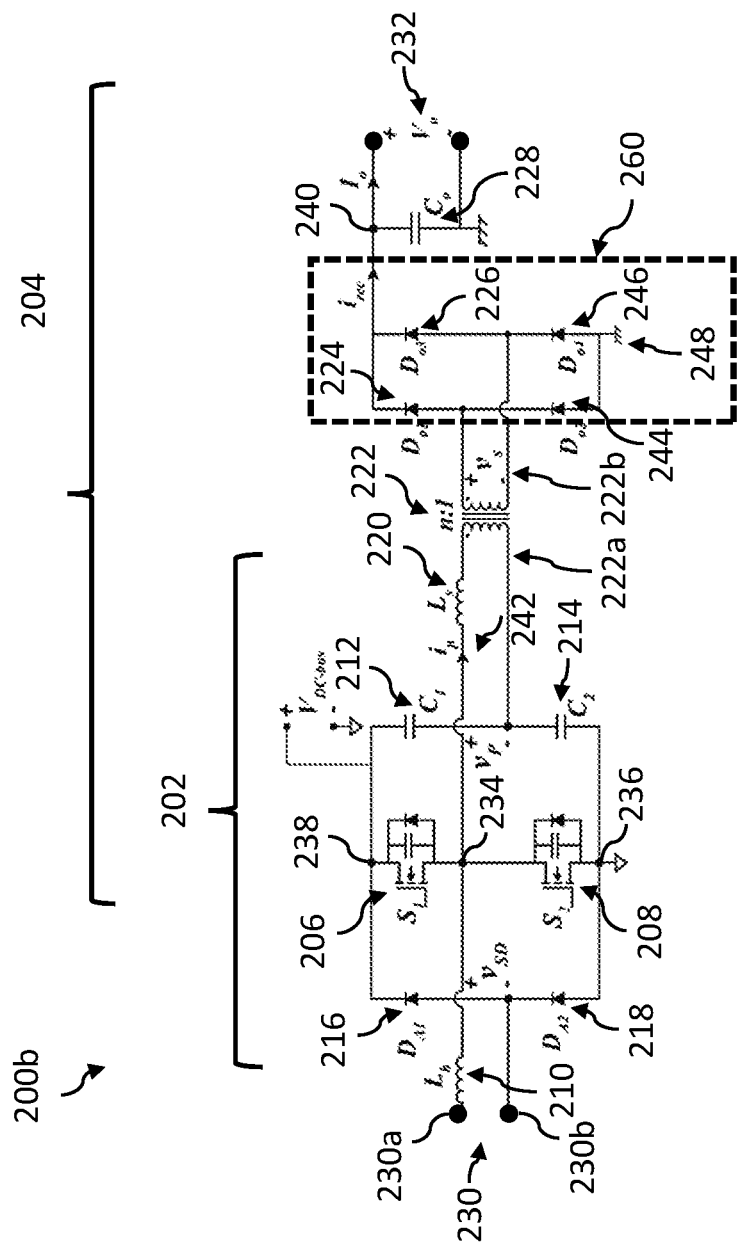
FIG. 2B is a schematic diagram illustrating an example implementation of a single-stage AC/DC converter where the transformer secondary output is a full-bridge rectifier with a non-center-tapped secondary, according to the systems and methods described in the present application.

FIG. 2B is a schematic diagram illustrating an example implementation of a single-stage AC/DC converter 200b where the transformer secondary output is a full-bridge rectifier with a non-center-tapped secondary. Single-stage AC/DC converter 200b includes additional diodes 244 and 246, which in conjunction with diodes 224 and 226 form a full-bridge rectifier. The same reference numbers as used in FIG. 2A are used in FIG. 2B to denote the same or similar elements.

Diodes 244 and 246 are electrically coupled to a ground 248 (also referred to in the present application as a fourth rail node).

In other implementations, the transformer secondary output can be a full-wave voltage doubler. This may be advantageous for an application with a higher output voltage, such as a ~400 V electric vehicle battery charger.

Figure 2C:
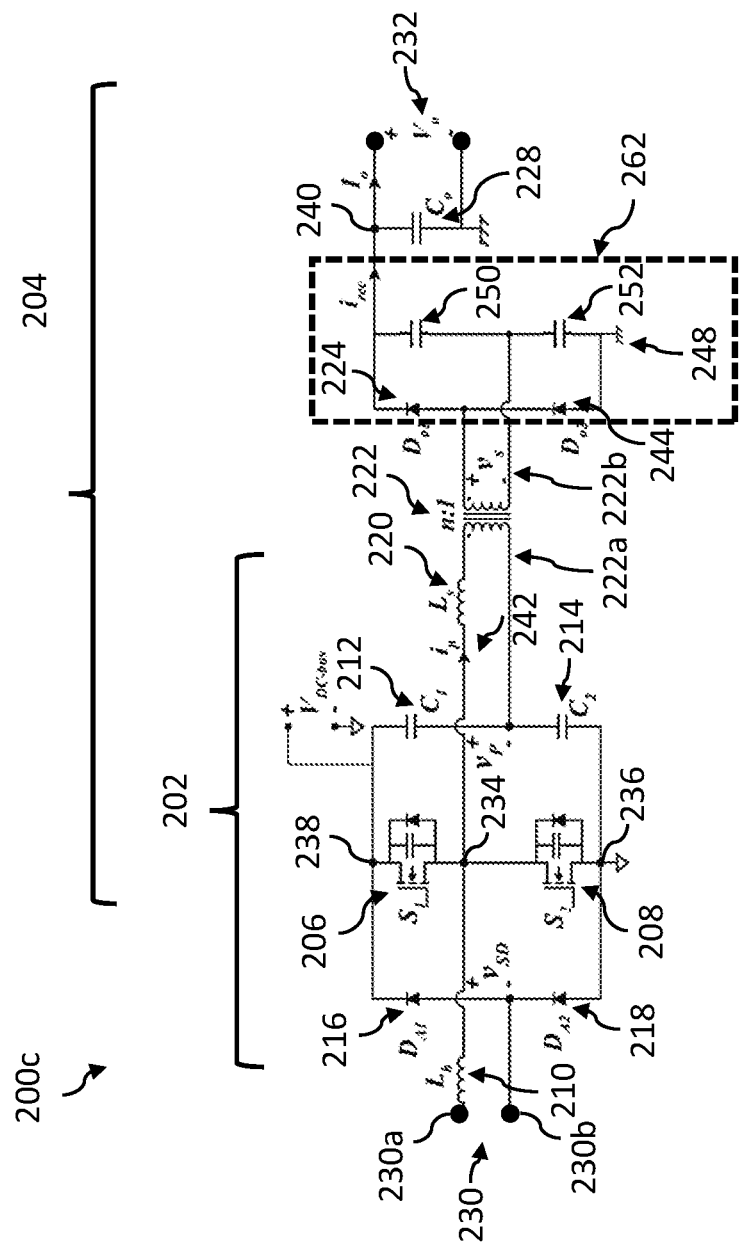
FIG. 2C is a schematic diagram illustrating an example implementation of a single-stage AC/DC converter where the transformer secondary output is a full-wave voltage doubler, according to the systems and methods described in the present application.

FIG. 2C is a schematic diagram illustrating an example implementation of a single-stage AC/DC converter 200c where the transformer secondary output is a full-wave voltage doubler. Single-stage AC/DC converter 200c includes capacitors 250 and 252, which replace diodes 226 and 246 of single-stage AC/DC converter 200b of FIG. 2B. The same reference numbers as used in FIGS. 2A and 2B are used in FIG. 2C to denote the same or similar elements.

Figure 2D:
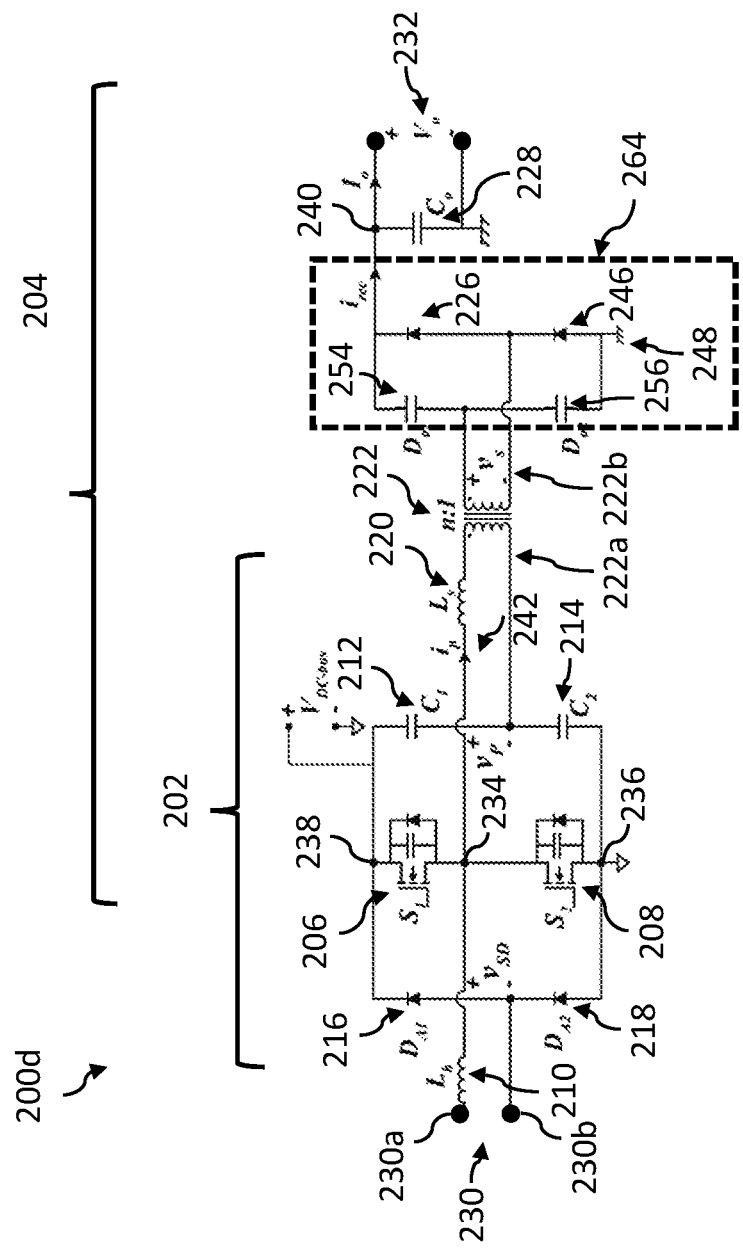
FIG. 2D is a schematic diagram illustrating another example implementation of a single-stage AC/DC converter where the transformer secondary output is a full-wave voltage doubler, according to the systems and methods described in the present application.

FIG. 2D is a schematic diagram illustrating an example implementation of a single-stage AC/DC converter 200d where the transformer secondary output is a full-wave voltage doubler. Single-stage AC/DC converter 200d includes capacitors 254 and 256, which replace diodes 224 and 244 of single-stage AC/DC converter 200b of FIG. 2B. The same reference numbers as used in FIGS. 2A, 2B, and 2C are used in FIG. 2D to denote the same or similar elements.

The single-stage AC/DC converter 200a of FIG. 2A includes an output rectifier circuit 258 that includes diodes 224 and 226. The single-stage AC/DC converter 200b of FIG. 2B includes an output rectifier circuit 260 that includes diodes 224, 226, 244, and 246. The single-stage AC/DC converter 200c of FIG. 2C includes an output rectifier circuit 262 that includes diodes 224 and 244, and capacitors 250 and 252. The single-stage AC/DC converter 200d of FIG. 2D includes an output rectifier circuit 264 that includes diodes 226 and 246, and capacitors 254 and 256.

In some implementations, storage capacitors 212 and 214 are replaced by a single capacitor similar to capacitor 112 of FIG. 1. A DC blocking capacitor may be included to prevent DC voltage being applied to transformer 222 of FIG. 2A.

An input voltage can be provided at input nodes 230, which comprise a first AC voltage source input 230a and a second AC voltage source input 230b. Input voltage at input nodes 230 can be an alternating current (AC) voltage, such as a first AC input line connected to the first AC voltage source input 230a and a second AC input line connected to the second AC voltage source input 230b. As used herein, the terms "connectable" and "connected" may be synonymous with "electrically coupleable" and "electrically coupled," respectively, unless the context indicates otherwise. Input voltage at input nodes 230 can be provided by an AC supply or an AC grid, for example. A DC voltage can be output at nodes 232, which may be connectable to a load such that DC current may be delivered to the load.

The particular arrangement of the various components of the single-stage AC/DC converter 200 is now discussed with reference to FIG. 2. As shown, the boost inductor 210 is connected between the first AC voltage source input 230a and a central node 234. The switch 208 is connected between the central node 234 and a first rail node 236. The switch 208 has a body diode oriented to pass current from the first rail node 236 to the central node 234. The switch 206 is connected between the central node 234 and a second rail node 238. The switch 206 has a body diode oriented to pass current from the central node 234 to the second rail node 238. The recovery diode 218 is connected between the first rail node 236 and the second AC voltage source input 230b and is oriented to pass current from the first rail node to the second AC voltage source input. The recovery diode 216 is connected between the second rail node 238 and the second AC voltage source input 230b and is oriented to pass current from the second AC voltage source input to the second rail node. The inductor 220 is connected between the central node 234 and a first end of the primary winding 222a of the transformer 222. The capacitor 214 is connected between the first rail node 236 and the second end of the primary winding 222a of the transformer 222. The capacitor 212 is connected between the second rail node 238 and the second end of the primary winding 222a of the transformer 222. The diode 224 is connected between the first end of the secondary winding 222b of the transformer 222 and a third rail node 240 and is oriented to pass current from the first end of the secondary winding of the transformer to the third rail node 240. The diode 226 connected between the second end of the secondary winding 222b of the transformer 222 and the third rail node 240 and is oriented to pass current from the second end of the secondary winding of the transformer to the third rail node 240.

In the example implementation of single-stage AC/DC converter 200a of FIG. 2A, diodes 224 and 226 are electrically connected to a positive rail (for example, third rail node 240 of FIG. 2A), and the center-tap of transformer 222 is electrically connected to a negative rail (for example, a ground 241, also referred to in the present application as a fourth rail node). In some implementations of single-stage AC/DC converter 200a of FIG. 2A, the center-tap of transformer 222 is electrically connected to the positive rail, diodes 224 and 226 are electrically connected to the negative rail (for example, ground 241), and diodes 224 and 226 are operable to return a current from the negative rail to secondary winding 222b.

There are a number of structural differences between the topology of single-stage AC/DC converter 100 of FIG. 1 and single-stage AC/DC converter 200a of FIG. 2A. For example, in single-stage AC/DC converter 100 of FIG. 1, the DC-blocking capacitor 118 is arranged in series with a primary winding of transformer 120. In single-stage AC/DC converter 200a of FIG. 2A, a split-capacitor half-bridge DC/DC converter 204 can eliminate, or at least reduce, DC current, and improve EMI performance of single-stage AC/DC converter 200a.

Single-stage AC/DC converter 200a includes inductor 220 in series with the primary winding 222a of transformer 222. In some implementations, a leakage inductance of transformer 222 of FIG. 2A is used to provide an inductance of inductor 220, and a magnetizing inductance of transformer 222 is sufficiently high so as not to affect operation of single-stage AC/DC converter 200a. In AC/DC converter 100 of FIG. 1, a leakage inductance of transformer 120 is considered negligible for practical purposes, and a magnetizing inductance $L_m$ of transformer 120 plays a significant role in operation of AC/DC converter 100.

Operating modes of single-stage AC/DC converter 100 of FIG. 1 and single-stage AC/DC converter 200 of FIG. 2 are different from each other. In operation of single-stage AC/DC converter 100, transformer primary current $i_p$ 134 does not change polarity while switch 106 is ON sufficiently to cause output diode 122 to commutate. A transformer primary current is defined as a current flowing through a primary winding of a transformer. In operation of single-stage AC/DC converter 200a, transformer primary current $i_p$ 240 changes polarity (e.g. from negative to positive) while switch 206 is ON sufficiently to cause output diodes 224 and 226 to commutate while switch 206 is ON. In operation of single-stage AC/DC converter 200b, transformer primary current $i_p$ 242 changes polarity (e.g. from negative to positive) while switch 206 is ON sufficiently to cause output diodes 224, 226, 244, and 246 to commutate. In operation of single-stage AC/DC converter 200c, transformer primary current 242 changes polarity while switch 206 in ON sufficiently to cause output diodes 224 and 226 to commutate.

Figure 6:
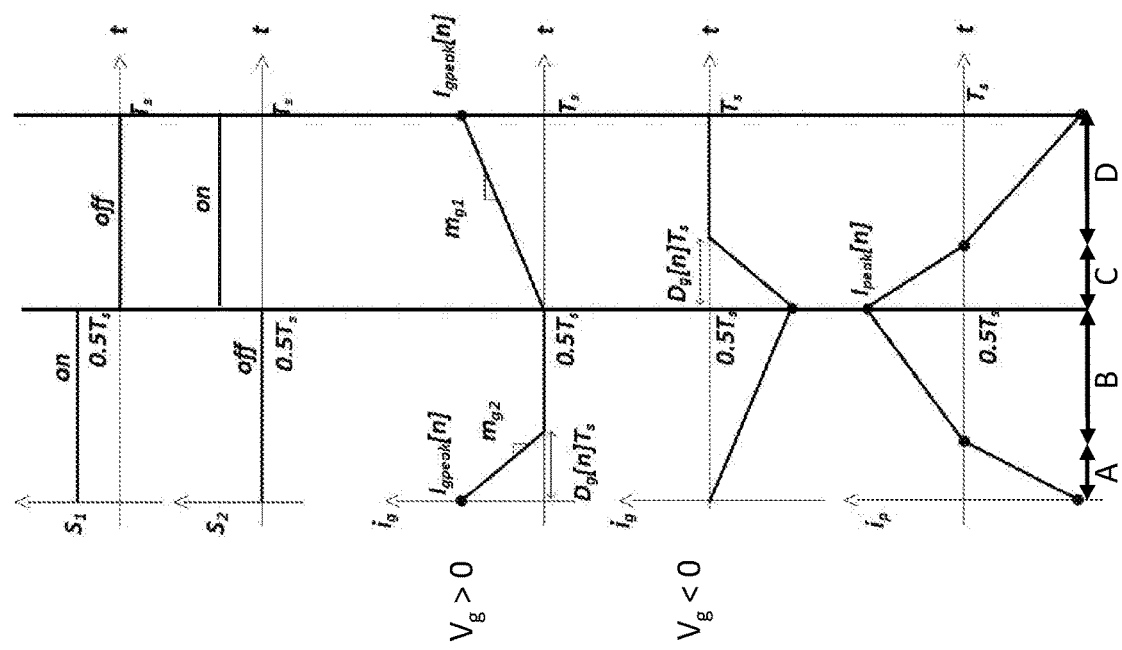
FIG. 6 is a schematic diagram illustrating grid current waveforms of the single-stage AC/DC converter of FIG. 2A operating in a Discontinuous Conduction Mode (DCM).

FIG. 6 (described in more detail below) illustrates example grid current waveforms of a single-stage AC/DC converter (such as single-stage AC/DC converter 200a of FIG. 2A), and shows, for example, a change in polarity of transformer primary current 134 while switch 206 is ON.

The present technology (illustrated for example in FIGS. 2A and 2B) can adjust a point at which a transformer primary current (e.g. transformer primary current 134 of FIG. 2A or transformer primary current 242 of FIG. 2B) changes polarity. An adjustment can be made, for example, by varying the size of one or more inductors in the circuit and/or by varying one or more instantaneous voltages.

Referring again to FIG. 1, output inductor 126 can be beneficial for operation of single-state AC/DC converter 100. An output inductor is not present in single-stage AC/DC converters 200a, 200b, 200c, and 200d. Benefits of eliminating the output inductor (such as output inductor 126 of FIG. 1) include reduced cost and size.

FIGS. 3A, 3B, 3C, and 3D are schematic diagrams illustrating operational modes for a positive half line period of an example implementation of a single-stage AC/DC converter, according to the systems and methods described in the present application (for example, single-stage AC/DC converter 200a of FIG. 2A). A positive half-cycle is the time during which $V_g > 0$, where $V_g$ is the input AC voltage at nodes 230.

Figure 3A:
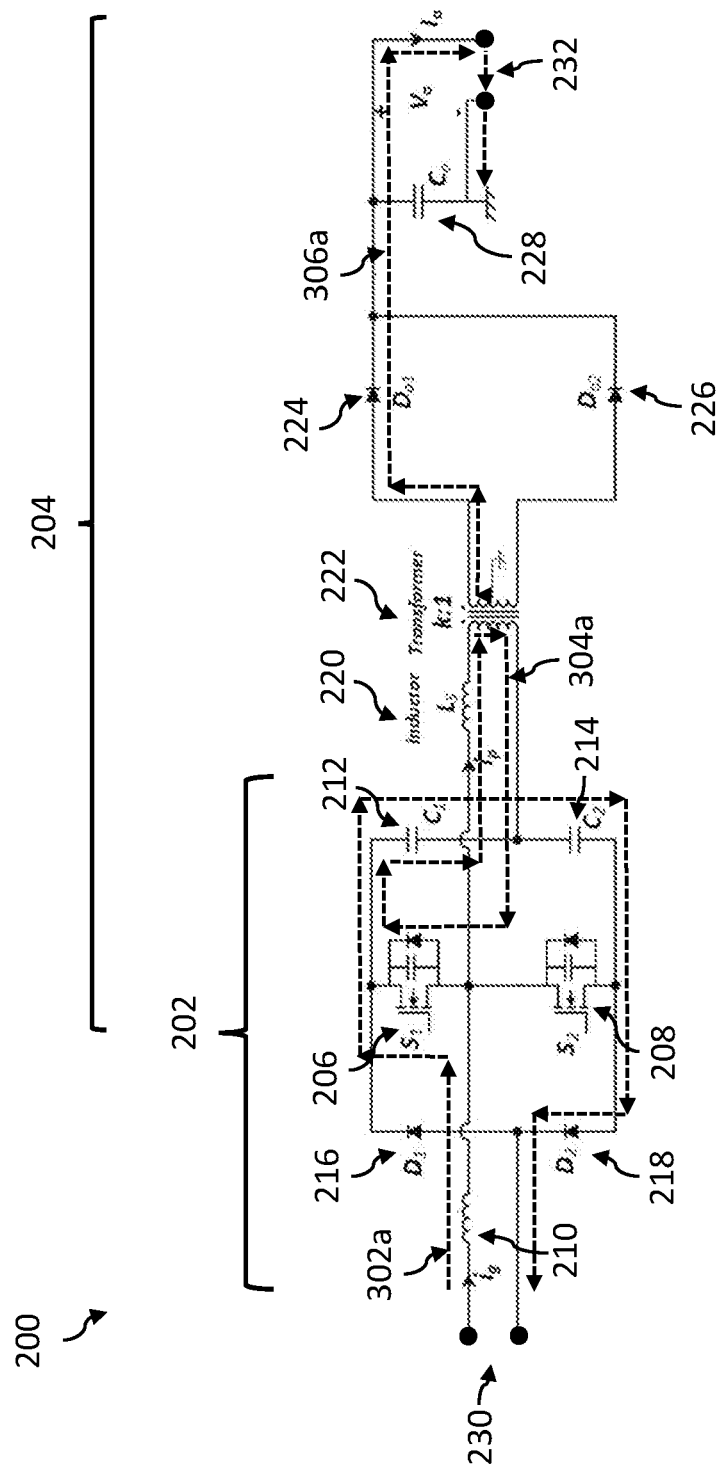
FIGS. 3A, 3B, 3C, and 3D are schematic diagrams illustrating operational modes for a positive half line period of an example implementation of a single-stage AC/DC converter, according to the systems and methods described in the presentation.

FIG. 3A illustrates mesh grid current 302a, mesh transformer primary current 304a, and output current 306a. Currents 302a, 304a, and 306a are depicted by dashed lines in FIG. 3A with a direction of each current indicated by arrows on the respective dashed line. A mesh current is a current flowing in a closed loop.

Figure 3B:
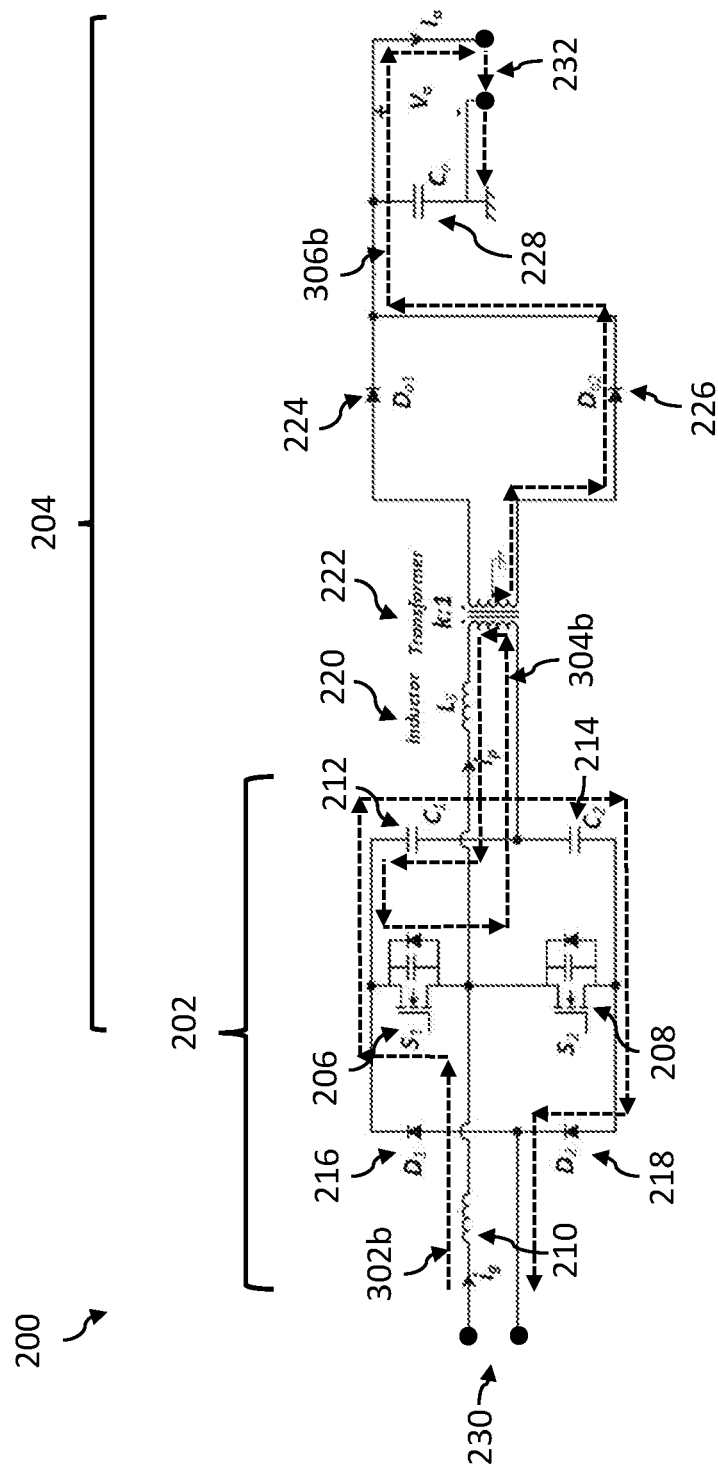

In FIG. 3A, $V_g > 0$, switch 206 is ON, and output diode 224 is ON. In FIG. 3B, $V_g > 0$, switch 206 is ON, and output diode 226 is ON. Mesh grid current 302a of FIG. 3A and mesh grid current 302b of FIG. 3B travel through switch 206, storage capacitors 212 and 214, and diode 218, causing storage capacitors 212 and 214 to charge, and boost inductor 210 to discharge. Mesh transformer primary current 304a of FIG. 3A and mesh transformer primary current 304b of FIG. 3B travel through switch 206, storage capacitor 212, and inductor 220.

The direction of mesh transformer primary current (for example, mesh transformer primary current 304a of FIG. 3A or mesh transformer primary current 304b of FIG. 3B) can determine which of output diodes 224 and 226 is conducting. When mesh transformer primary current is positive, output diode 224 conducts as shown in FIG. 3A, for example. When the mesh transformer primary current is negative, output diode 226 conducts as shown in FIG. 3B, for example.

Figure 3C:
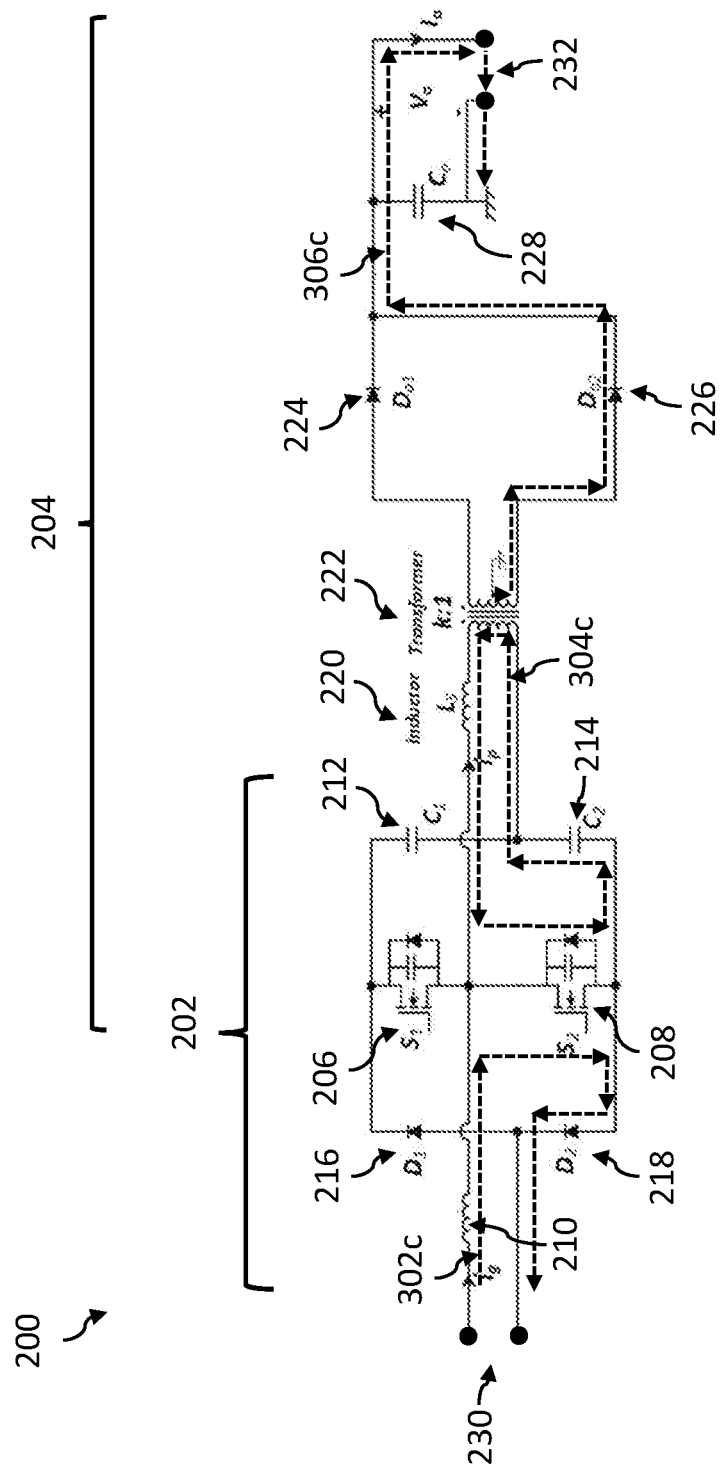
Figure 3D:
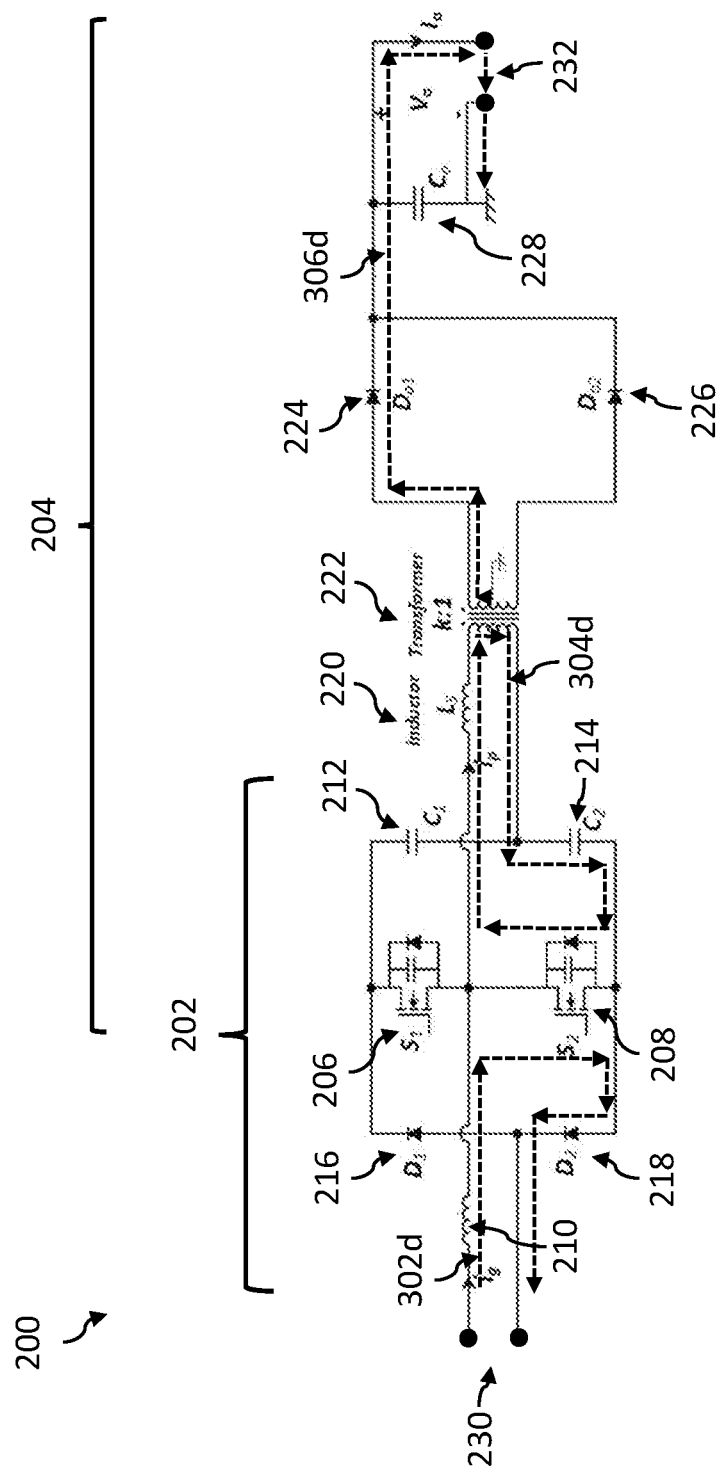

In FIG. 3C, $V_g > 0$, switch 208 is ON, and output diode 226 is ON. In FIG. 3D, $V_g > 0$, switch 208 is ON, and output diode 224 is ON. Mesh grid current 302c of FIG. 3C and mesh grid current 302d of FIG. 3D travel through switch 208, and diode 218, which causes inductor 210 to charge. At the same time, mesh transformer primary current travels through switch 208 and storage capacitor 214. As described above, when mesh transformer primary current is positive, output diode 224 conducts as shown in FIG. 3D, for example. When the mesh transformer primary current is negative, output diode 226 conducts as shown in FIG. 3C, for example.

Single-stage AC/DC converters 200b of FIG. 2B, 200c of FIG. 2C, and 200d of FIG. 2D can be operated in a similar manner.

FIG. 3B illustrates mesh grid current 302b, mesh transformer primary current 304b, and output current 306b. Currents 302b, 304b, and 306b are depicted by dashed lines in FIG. 3B with a direction of each current indicated by arrows on the respective dashed line.

FIG. 3C illustrates mesh grid current 302c, mesh transformer primary current 304c, and output current 306c. Currents 302c, 304c, and 306c are depicted by dashed lines in FIG. 3C with a direction of each current indicated by arrows on the respective dashed line.

FIG. 3D illustrates mesh grid current 302d, mesh transformer primary current 304d, and output current 306d. Currents 302d, 304d, and 306d are depicted by dashed lines in FIG. 3D with a direction of each current indicated by arrows on the respective dashed line.

FIGS. 4A, 4B, 4C, and 4D are schematic diagrams illustrating operational modes for a negative half-cycle of an example implementation of a single-stage AC/DC converter, according to the systems and methods described in the present application (for example, single-stage AC/DC converter 200 of FIG. 2). A negative half-cycle is the time during which $V_g < 0$, where $V_g$ is the input AC voltage at nodes 230. Operational modes during a negative half-cycle are similar to operational modes during a positive half-cycle as described above with reference to FIGS. 3A, 3B, 3C, and 3D.

Figure 4A:
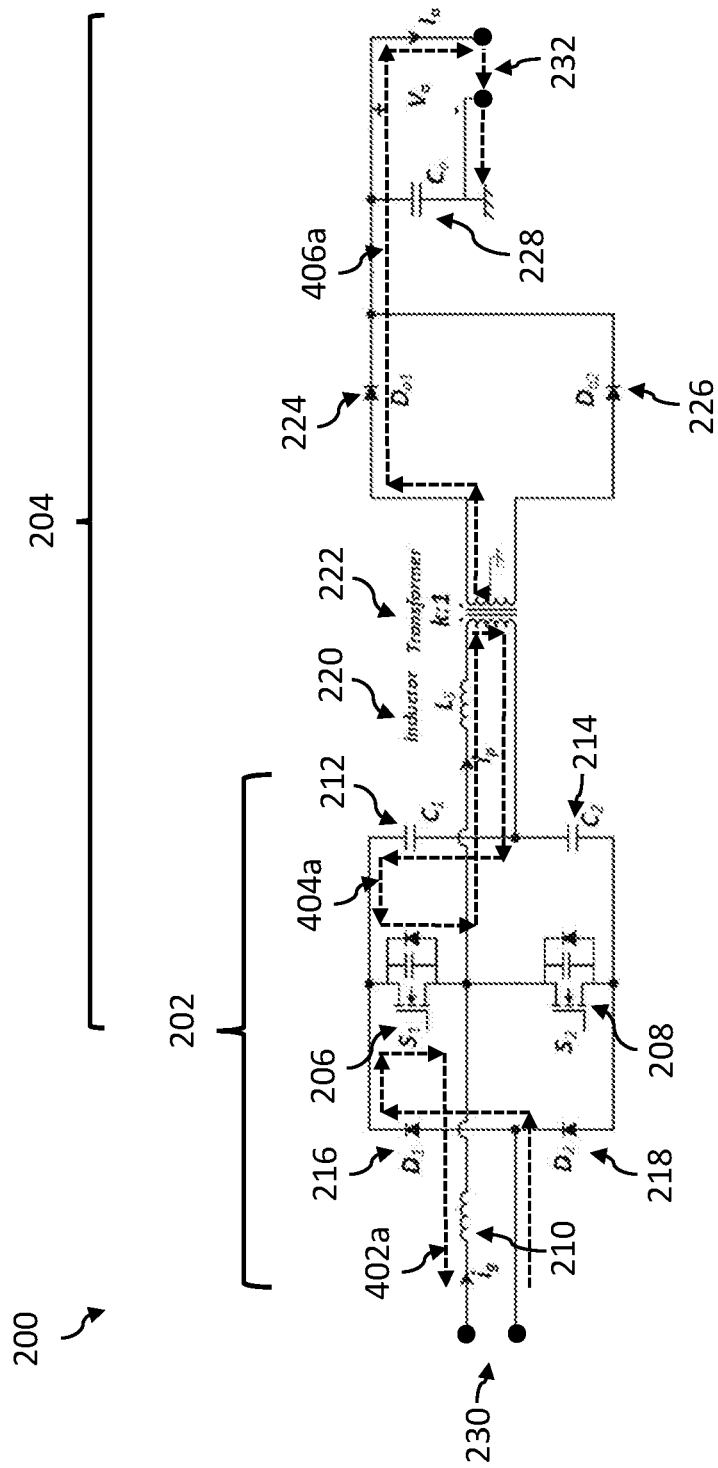
FIGS. 4A, 4B, 4C, and 4D are schematic diagrams illustrating operational modes for a negative half-cycle of an example implementation of a single-stage AC/DC converter, according to the systems and methods described in the presentation.

FIG. 4A illustrates mesh grid current 402a, mesh transformer primary current 404a, and output current 406a. Currents 402a, 404a, and 406a are depicted by dashed lines in FIG. 4A with a direction of each current indicated by arrows on the respective dashed line.

Figure 4B:
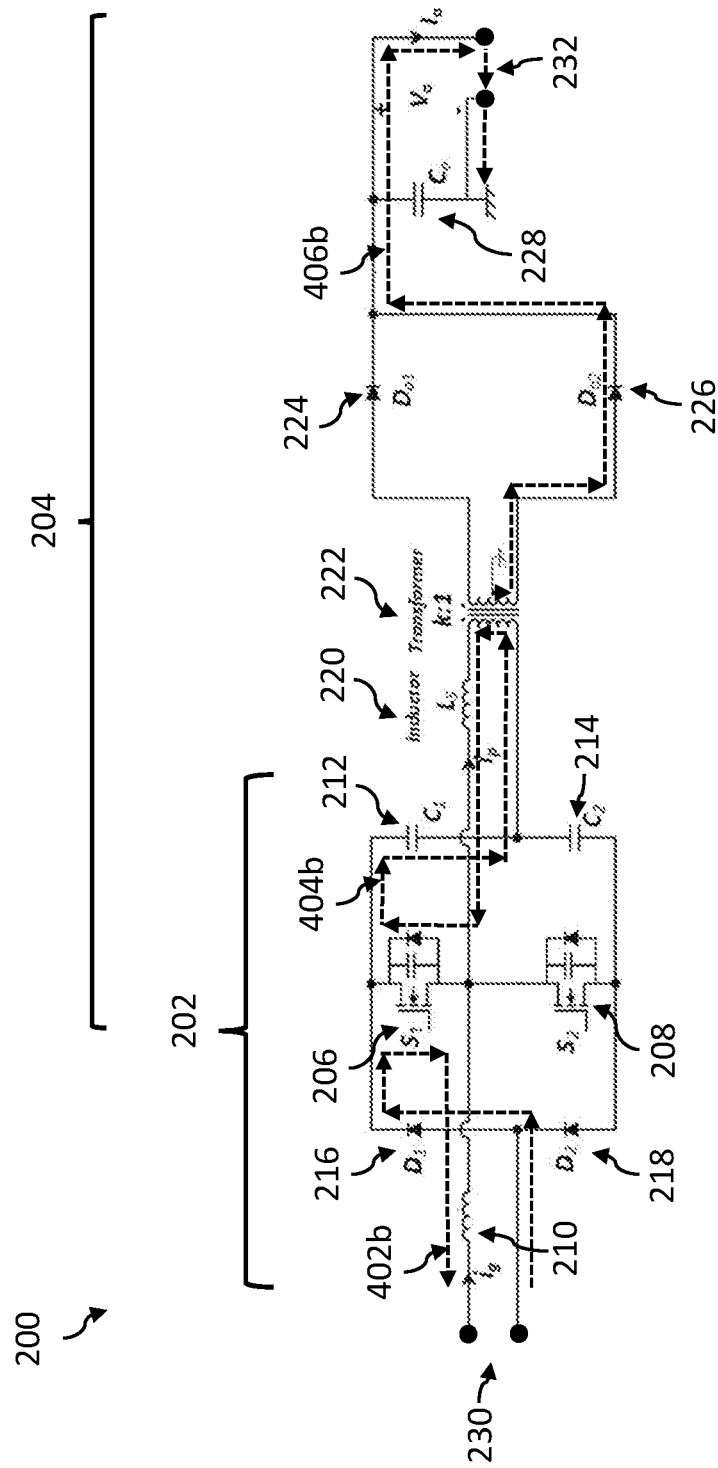

FIG. 4B illustrates mesh grid current 402b, mesh transformer primary current 404b, and output current 406b. Currents 402b, 404b, and 406b are depicted by dashed lines in FIG. 4B with a direction of each current indicated by arrows on the respective dashed line.

Figure 4C:
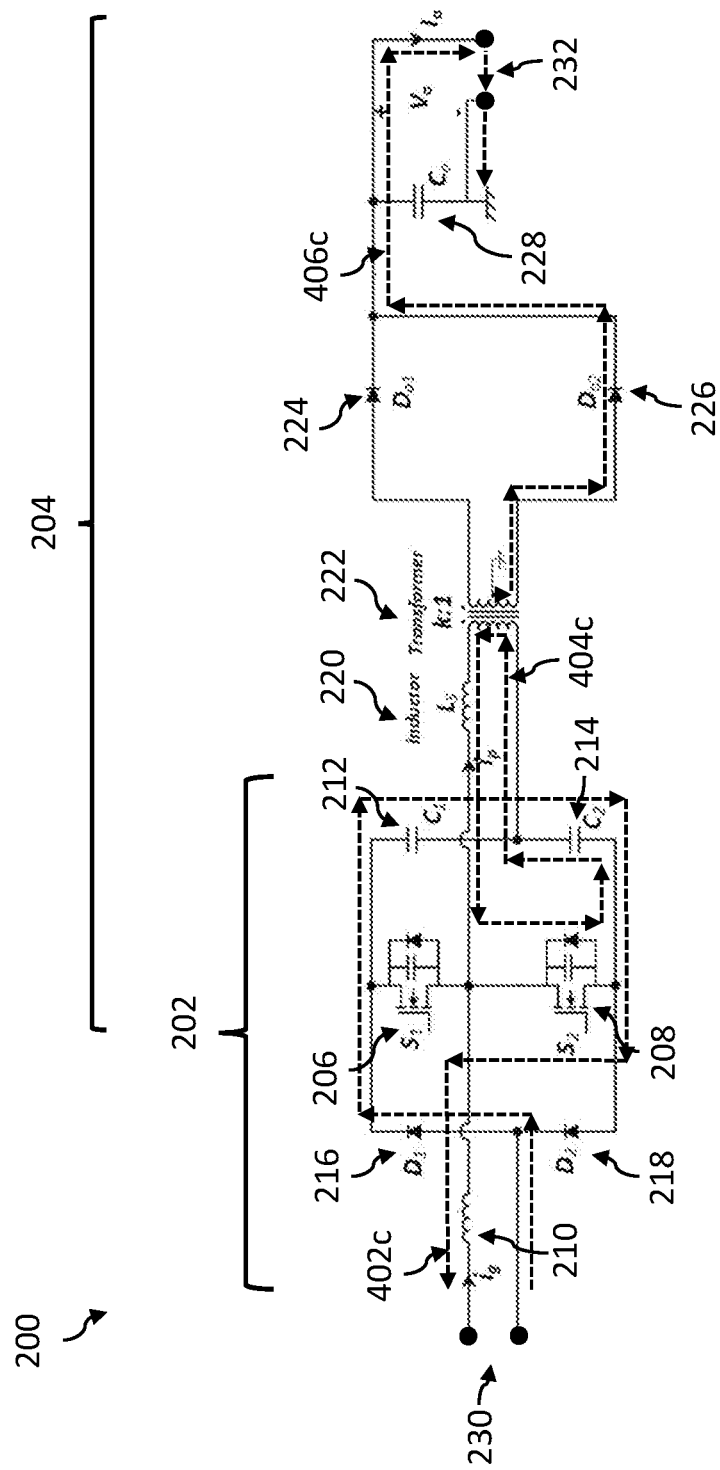

FIG. 4C illustrates mesh grid current 402c, mesh transformer primary current 404c, and output current 406c. Currents 402c, 404c, and 406c are depicted by dashed lines in FIG. 4C with a direction of each current indicated by arrows on the respective dashed line.

Figure 4D:
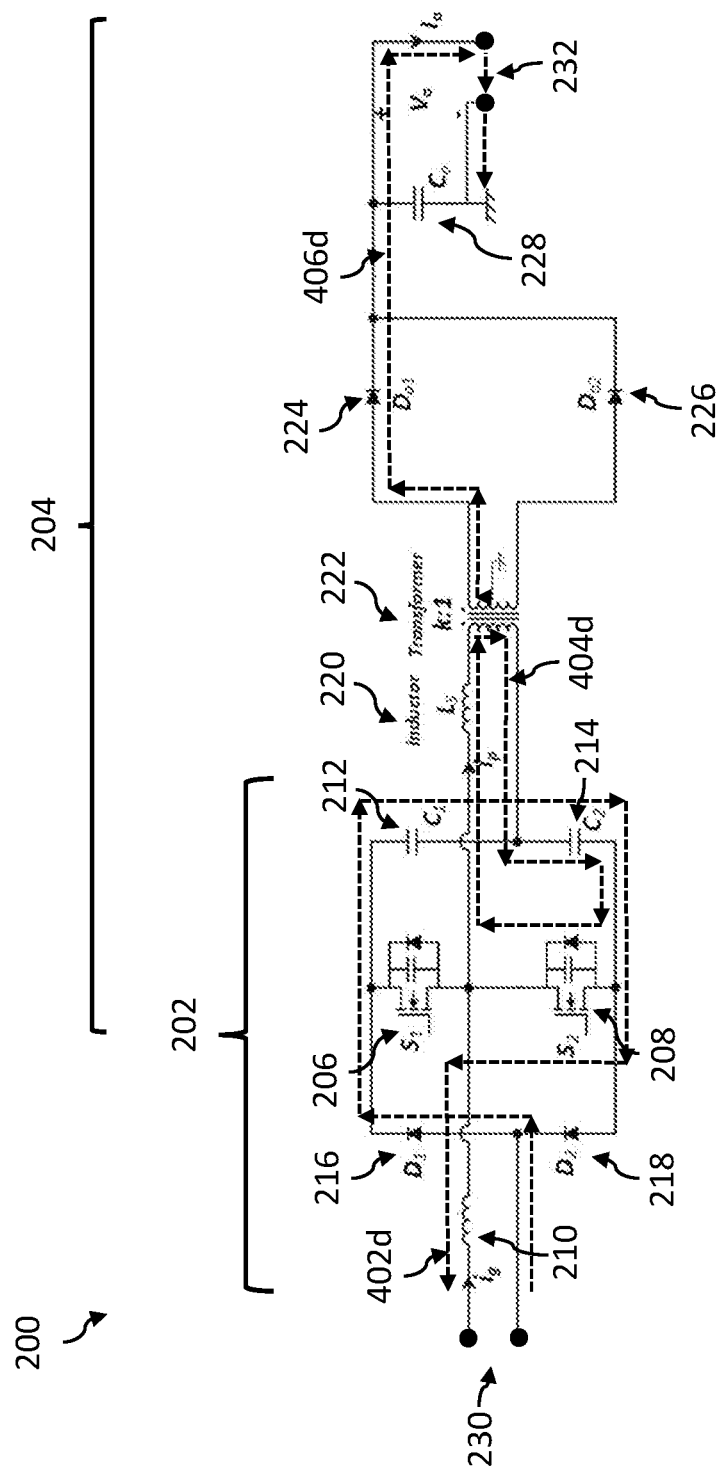

FIG. 4D illustrates mesh grid current 402d, mesh transformer primary current 404d, and output current 406d. Currents 402d, 404d, and 406d are depicted by dashed lines in FIG. 4D with a direction of each current indicated by arrows on the respective dashed line.

The following paragraphs describe a fixed duty cycle control method for a single-stage AC/DC converter, for example single-stage AC/DC converter 200 of FIG. 2. In at least some implementations, the control method is a single-feedback control method, for example a control method that includes a measurement of output current and/or output voltage. In other implementations, an AC voltage measurement is included in the control method.

Figure 5:
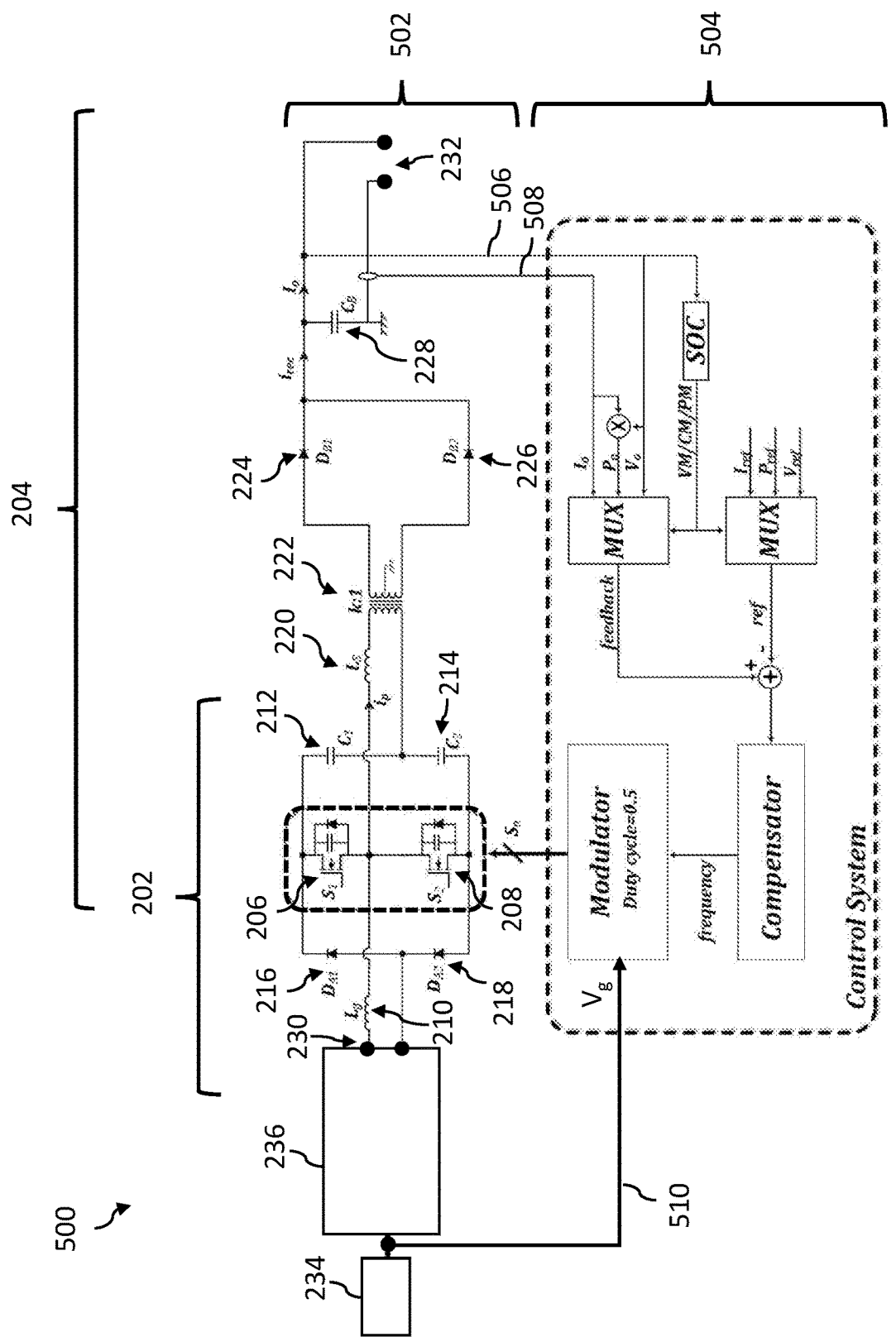
FIG. 5 is a schematic diagram illustrating a system 500 that includes a single-stage AC/DC converter.

FIG. 5 is a schematic diagram illustrating a system 500 that includes a single-stage AC/DC converter (for example, single-stage AC/DC converter 200 of FIG. 2). System 500 includes a power subsystem 502 and a control subsystem 504 (also referred to herein as "control system"). Power subsystem 502 includes the boost PFC AC/DC converter 202, and the half-bridge DC/DC converter 204, electrically coupled to each other.

Boost PFC AC/DC converter 202 includes switches 206 and 208. Switching patterns for switches 206 and 208 can perform input PFC and output current regulation simultaneously. Control subsystem 504 is responsible for creating switching patterns for switches 206 and 208. Control subsystem 504 can modify a duty cycle and a switching frequency to create a switching pattern.

In a typical control system for a half-bridge single-stage AC/DC converter, a duty cycle is used as a control modulation, and the switching frequency is kept constant. A shortcoming of a typical control system for a half-bridge single-stage AC/DC converter is that it may impose DC current injection into the grid or from the grid. Approaches that use duty cycle control are practically useful only when the voltage gain of the DC/DC converter (ratio of a DC bus voltage to an output voltage) is symmetric about a duty cycle of 0.5.

In the systems and methods described in the present application, control stage 504 modulates a switching frequency and keeps the duty cycle fixed, for example at a value of 0.5 or approximately 0.5. One advantage of control subsystem 504 is that it can be used with various half-bridge single-stage topologies regardless of which DC/DC topology is used in the single-stage AC/DC converter. For example, control subsystem 504 can be used for half-bridge single-stage AC/DC converters that use flyback, buck, boost, or forward converters (including isolated, non-isolated, and resonant topologies) as their DC/DC conversion stage. In at least some implementations, control subsystem 504 uses a single feedback, which makes it simpler, and cheaper than typical control systems. In the implementation of FIG. 5, feedback in control subsystem 504 includes output current measurement 508, output voltage measurement 506, and AC voltage measurement 510.

Control subsystem 504 also has a desirable transient response. For example, control subsystem 504 can regulate an output within milliseconds in response to a change in load. The transient response can be improved by attempting to optimize one or more control parameters, and by using nonlinear control instead of simple linear compensators.

FIG. 6 is a schematic diagram illustrating grid current waveforms of single-stage AC/DC converter 200a of FIG. 2A operating in a Discontinuous Conduction Mode (DCM). Each of time periods A, B, C, D of FIG. 6 corresponds to operating modes illustrated in FIGS. 3A through 3D respectively, and 4A through 4D respectively.

The power transfer in DCM can be expressed as follows:

$$\langle P_{in}\rangle_{T_g} = \frac{1}{L_g \pi f_s} \int_0^{\pi/2} \frac{(v_g(t)D'(t))^2}{1-\frac{v_g(t)}{V_{dc}}} dt$$

where $v_g(t)$ is a grid voltage, $L_g$ is a boost inductance, $f_s$ is a switching frequency, $V_{dc}$ is a DC bus voltage, and D (t) is a duty cycle where D (t)=1−D'(t).

Since switching frequency $f_s$ is inversely proportional to power, switching frequency can used as a sole control variable to regulate an output current, voltage, and power.

Referring to FIG. 6, $D_g[n]T_S$ is a time taken for the current to reach zero in a switching period. For DCM operation, the current needs sufficient time to reach to zero, and so, for $i_g$<0, $D_9$ [n]<D [n], and, for $i_g$>0, D (t)=D'(t)=0.5.

Referring to FIG. 6, at t=$T_S$, initially switch $S_2$ is conducting and switch $S_1$ is OFF. At a switching instant, $S_2$ turns OFF and, after a dead-time, $S_1$ turns ON. To achieve ZVS at the switching instant, a current passing through each of switches $S_1$ and $S_2$ during the dead-time is ideally such that it charges and discharges an output capacitance of switches $S_1$ and $S_2$, respectively. In this configuration, $i_g(T_S)-i_p(T_S)>0$. As illustrated in FIG. 6, $i_g(T_S)>0$ and $i_p(T_S)<0$.

Referring to FIG. 6 at t=0.5$T_S$, initially switch $S_1$ is conducting and $S_2$ is OFF. At the switching instant, $S_1$ turns OFF and after a dead-time $S_2$ turns ON. To achieve ZVS at the switching instant, ideally $i_g(T_S)-i_p(T_S)<0$. As illustrated in FIG. 6, $i_g(T_S)=0$ and $i_p(T_S)>0$, and so the condition can be satisfied.

In some implementations, ZVS occurs for a switch (for example, switch $S_1$ or switch $S_2$) only when it turns ON. ZVS can be achieved when a current flowing through the switch when it turns ON is negative. ZVS can typically be assured in both positive and negative half-cycles if sufficient deadtime is provided to discharge an output capacitor of the switch.

As described above, and illustrated in FIG. 6, the systems and methods described in the present application provide ZVS operation of a bridgeless single-stage AC/DC/converter (for example single-stage AC/DC converter 200 of FIG. 2) in DCM. Benefits can include higher efficiency, lower EMI noise, and improved heat management of systems (for example, battery chargers).

A near-unity power factor can be achieved by synchronizing $i_{gpeak}[n]$ with the grid voltage. It can be desirable for the following equality to hold:

$$i_{gpeak}[n] = \gamma v_g[n]$$

where γ is a constant real number.

Referring again to FIG. 6, $i_{gpeak}[n]$ can be expressed as follows:

$$i_{gpeak}[n] = \frac{D'[n]}{L_g f_s} v_g[n]$$

The parameter γ can be expressed as:

$$\gamma = \frac{1}{2 L_g f_s}$$

In steady-state operation, switching frequency $f_s$ can be constant for an operating condition in which γ is constant, and there is near-unity power factor. Switching frequency $f_s$ can be adjusted in response to a change in the operating condition of the single-stage AC/DC converter (for example, in response to a change in input voltage or output load). In some implementations, the adjustment includes a discontinuous change in frequency, for example a step increase or decrease in switching frequency at the start of each line cycle until a desired switching frequency is reached. Since switching frequency is constant over a line cycle, PFC is achieved in steady state and transient operation of the single-stage AC/DC converter.

The following paragraphs describe the use of a relay in a boost inductor circuit to have two inductors in parallel or in series for better performance of a bridgeless single-stage AC/DC converter over a range of different line voltages (for example, universal line RMS voltage between 85 V and 265 V).

To provide optimal, or at least superior, performance for a wide input voltage range, while limiting the switching frequency to a practically reasonable range, the inductance of the boost inductor can be selectively varied to provide a variable inductance inductor. For the example bridgeless single-stage AC/DC converter 200 of FIG. 2, inductances of 160 μH and 40 μH can be used in low line (120 $V_{RMS}$) and high line (230 $V_{RMS}$) respectively, to prevent the converter from operating above 220 kHz frequency, and thereby avoiding, or at least reducing, EMI and/or improving efficiency.

In one implementation, two 80 μH inductors and a boost inductor switching circuit in the form of a double-pole double-throw (DPDT) relay are used to create 160 μH and 40 μH inductances. Control subsystem 504 reads a line voltage prior to the start of the switching in the converter. If the line voltage is lower than 180 $V_{RMS}$ (for example, the line voltage is 120 $V_{RMS}$), control subsystem 504 sends a command to the relay to configure the two 80 μH inductances in parallel, which results in an equivalent boost inductance of 40 μH. If the line voltage is higher than 180 $V_{RMS}$ (for example, 230 $V_{RMS}$), control subsystem 504 sends a command to the relay to configure the two 80 μH inductances in series, which results in an equivalent boost inductance of 160 μH. It should be appreciated that although 180 $V_{RMS}$ is provided as an example threshold voltage level, other threshold voltage levels may be used.

In some implementations, pulse-skipping and/or burst-mode operation is used a) to increase an output regulation capability of an AC/DC converter, and/or b) to prevent the AC/DC converter from operating above a set switching frequency limit.

In some implementations, the modulation scheme of the control system includes a variable duty cycle and frequency control. With a modulation scheme that includes a variable duty cycle and modulation of a switching frequency, a DC bus voltage can be varied, for example reduced to a value as low as 400 VDC, depending on an input voltage and an output voltage of the converter. The modulation scheme described above can reduce the size and cost for components of a bridgeless single-stage AC/DC converter.

In some implementations, input diodes can be replaced by MOSFETs used as input synchronous rectifiers. For example, with reference to FIG. 2, each of diodes 216 and 218 can be replaced by a respective MOSFET. An advantage can be a reduction in input rectification losses, and increased efficiency.

In some implementations, output diodes can be replaced by MOSFETs used as output synchronous rectifiers. For example, with reference to FIG. 2, each of diodes 224 and 226 can be replaced by a respective MOSFET. An advantage can be a reduction in output rectification losses, and increased efficiency.

In some implementations, each of diodes 216, 218, 224, and 226 in FIG. 2A are replaced by a respective MOSFET, and single-stage AC/DC converter 200a becomes a bidirectional single-stage AC/DC converter, which can be advantageous in applications where bidirectional power flow is desired (for example, in solar inverter/chargers, and electric vehicle chargers with V2G (vehicle to grid power flow) functionality). Similarly, in some implementations, each of diodes 216, 218, 224, 226, 244, and 246 in FIG. 2B are replaced by a respective MOSFET. Similarly, in some implementations, each of diodes 216, 218, 224, and 244 in FIG. 2C are replaced by a respective MOSFET. Similarly, in some implementations, each of diodes 216, 218, 226, and 246 in FIG. 2D are replaced by a respective MOSFET.

In some implementations, other DC/DC topologies such as flyback, buck, boost, forward, resonant and non-resonant DC/DC converters, can be used as the DC/DC converter of the half-bridge single-stage AC/DC converter. Conventionally, in order to have a practical operation of half-bridge single-stage AC/DC converter with fixed frequency and variable duty cycle modulation, the DC/DC voltage gain has to be symmetric across duty cycle equal to 0.5. A benefit of the systems and methods described in the present application as they relate to fixed duty cycle and a variable frequency modulation scheme is that they allow for different DC/DC topologies.

In some implementations, a duty cycle other than 0.5 is used. When the duty cycle is other than 0.5, it can be beneficial to balance the duty cycle around the AC cycle to eliminate, or at least reduce, DC current being drawn from a grid. In some implementations, a duty cycle of D is used for the positive half-cycle, and a duty cycle of (1−D) is used for the negative half-cycle. In an example implementation, a duty cycle of 0.4 is used for the positive half-cycle, and a duty cycle of 0.6 is used for the negative half-cycle. When the duty cycle is other than 0.5, a measurement of the AC input voltage can be provided via feedback to the control subsystem. In some implementations, a combination of variable duty cycle and frequency control is used.

In some implementations, wide band gap (WBG) devices, including Gallium Nitride (GaN) and Silicon Carbide (SiC) are used advantageously to reduce switching losses, and potentially allow for higher frequency operation, which can improve the power density by shrinking the sizes of the inductors and transformer. SiC FETs can be particularly suitable, because they are available at higher rated voltages, including 900 V and 1200 V, and can perform better than a high-voltage (800 V)-rated silicon super junction MOSFET, for example.

In an example implementation, a 650 V-rated silicon super junction MOSFET can be used, and may reduce cost and/or power factor, and/or increase ripple current. In other implementations, a lower-rated silicon MOSFET can be used.

In some implementations, the input inductor (also referred to in the present application as the boost inductor) is fixed, which may reduce cost, complexity, and size.

In some implementations, the input inductor switching circuit includes two single-pole double-throw (SPDT) relays. In other implementations, the input inductor switching circuit includes one SPDT relay and one single-pole single-throw (SPST) relay. In other implementations, the inductor configuration switching is accomplished with mechanical switches, either set at the factory or user-accessible (like the 120/240V switch on some desktop computer power supplies). It could be a jumper that is populated one way or the other at the factory, reducing size and cost (no relay), and allowing a single PCB design. It could be solid state switches, such as MOSFETs, potentially reducing the size relative to relays, but increasing cost and conduction loss.

FIGS. 7A and 7B are schematic diagrams illustrating an example implementation of an input inductor switching circuit 700 according to the present disclosure. Input inductor switching circuit 700 includes a first inductance 702, a second inductance 704, a first relay 706, and a second relay 708. FIG. 7A shows a configuration of input inductor switching circuit 700 with first inductance 702 in series with second inductance 704. FIG. 7B shows a configuration of input inductor switching circuit 700 with first inductance 702 in parallel with second inductance 704. In one implementation, relays 706 and 708 are implemented using a double-pole double-throw relay. In another implementation, relays 706 and 708 are single-pole double-throw relays. In yet another implementation, relay 706 is a single-pole single-throw relay, and relay 708 is a single-pole double-throw relay. In an example implementation, first inductance 702 and second inductance 704 each have a respective value of 80 μH.

The inductor in series with the transformer primary can be a physically separate inductor, which increases size and cost but may improve efficiency and cooling. The series inductor (for example, inductor 220 of FIG. 2) can be integrated into the transformer (for example, transformer 222 of FIG. 2) by deliberately increasing the transformer's leakage inductance, thereby reducing cost and size.

In some implementations, a bridgeless single-stage AC/DC converter as described in the present application may be operable in continuous conduction mode (CCM) instead of DCM. This would allow higher power operation, as well as lower cost input diodes (e.g., slow instead of fast) and boost inductors (e.g., toroid powder core instead of ferrite). One or more primary side and/or secondary side diodes may be replaced by switches. The modulation scheme may change in CCM. The control scheme may have to vary both the frequency and the duty cycle, which may increase the complexity of the converter. ZVS may be inherently achieved at some conditions.

Figure 8:
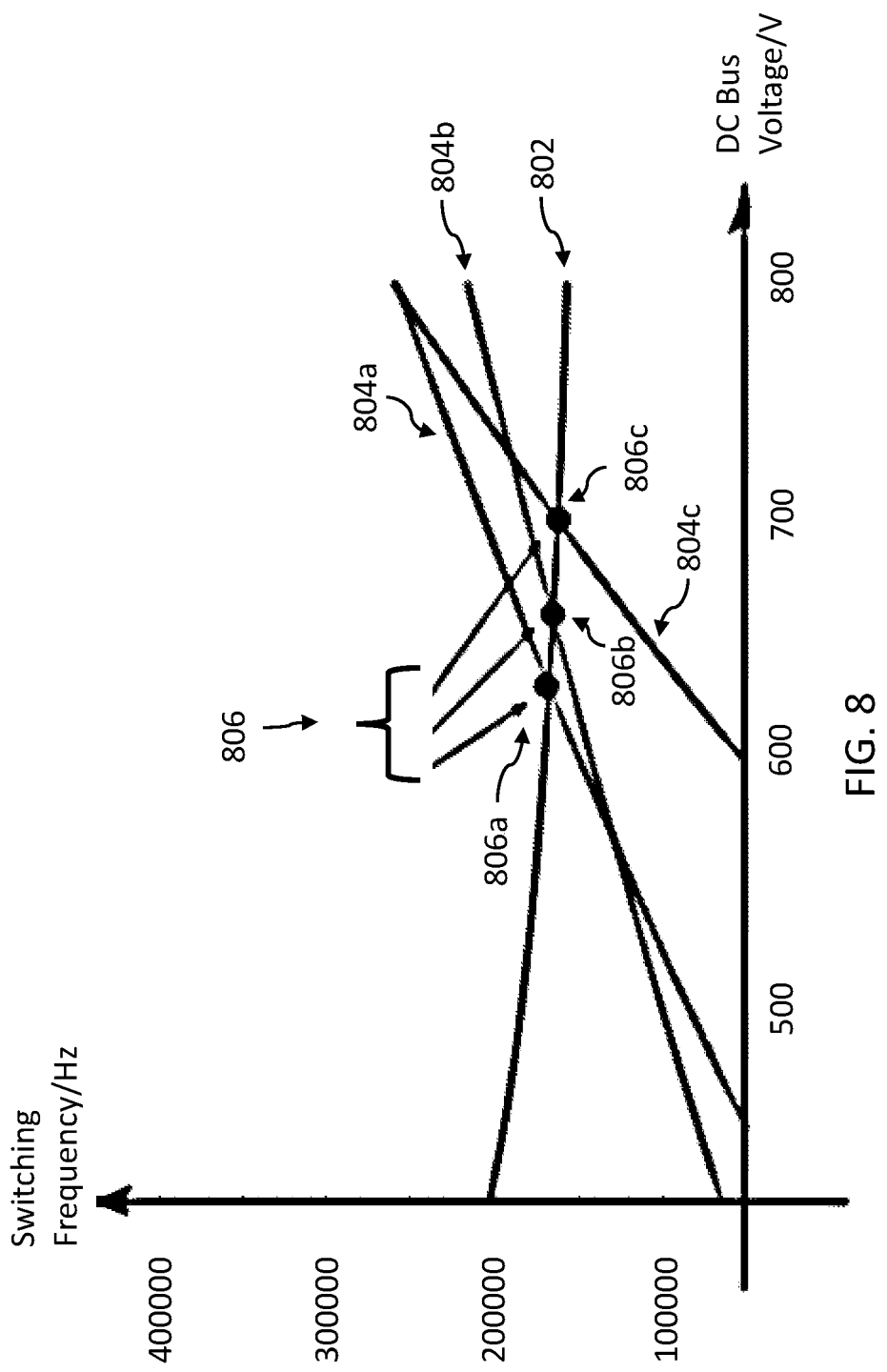
FIG. 8 is a graph illustrating example curves of switching frequency versus DC bus voltage for an AC/DC converter and an isolated half-bridge DC/DC converter, varying an output voltage at a fixed load power, according the present disclosure.

FIG. 8 is a graph illustrating example curves of switching frequency versus DC bus voltage for an AC/DC converter and an isolated half-bridge DC/DC converter, varying an output voltage at a fixed load power, according to the present disclosure. Curve 802 shows a variation of switching frequency with DC bus voltage for the AC/DC converter at 100% load. Curves 804a, 804b, and 804c show a variation of switching frequency with DC bus voltage for the isolated half-bridge DC/DC converter at a low, a medium, and a high output voltage, respectively.

Curves 804a, 804b, and 804c intersect curve 802 at intersections 806a, 806b, and 806c respectively (collectively referred to as intersections 806). Intersection 806a of curves 802 and 804a for the AC/DC converter (also referred to in the present application as the PFC stage) and the isolated half-bridge DC/DC converter respectively is an example of a suitable operating condition of the converter in a steady state. Similarly, intersection 806b of curves 802 and 804b for the AC/DC converter and the isolated half-bridge DC/DC converter respectively is an example of a suitable operating condition of the converter in a steady state. Similarly, intersection 806c of curves 802 and 804c for the AC/DC converter and the isolated half-bridge DC/DC converter respectively is an example of a suitable operating condition of the converter in a steady state.

Figure 9:
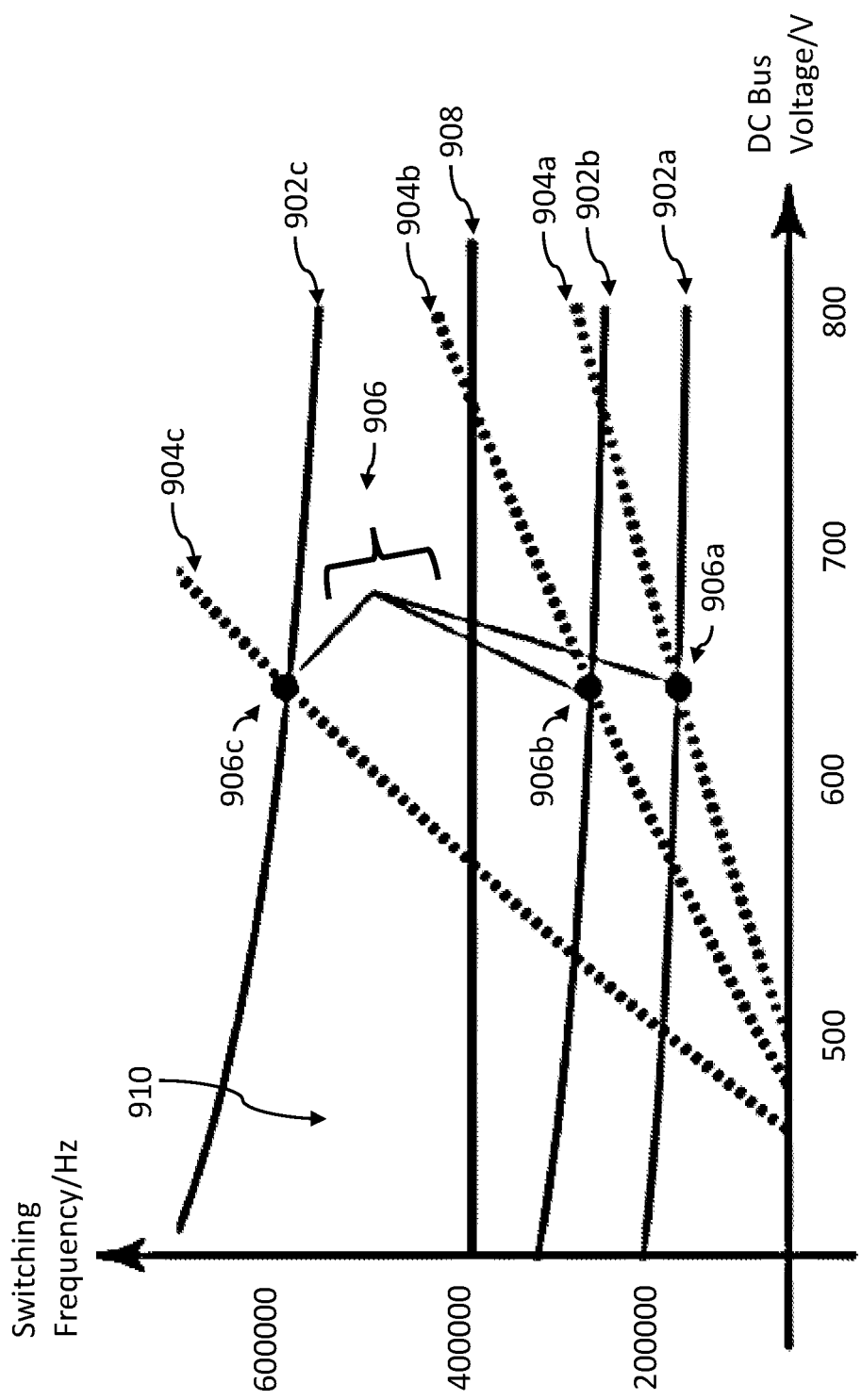
FIG. 9 is a graph illustrating example curves of switching frequency versus DC bus voltage for an AC/DC converter and an isolated half-bridge DC/DC converter, regulating a fixed voltage at a variable load power, according the present disclosure.

FIG. 9 is a graph illustrating example curves of switching frequency versus DC bus voltage for an AC/DC converter and an isolated half-bridge DC/DC converter, regulating a fixed voltage at a variable load power, according the present disclosure. Curves 902a, 902b, and 902c show a variation of switching frequency with DC bus voltage for the AC/DC converter at 100% output power, 66% output power, and 30% output power, respectively. Curves 904a, 904b, and 904c show a variation of switching frequency with DC bus voltage for the isolated half-bridge DC/DC converter at 100% output power, 66% output power, and 30% output power, respectively.

Curves 904a, 904b, and 904c intersect curves 902a, 902b, and 902c at intersections 906a, 906b, and 906c respectively (collectively referred to as intersections 906). Intersection 906a of curves 902a and 904a for the AC/DC converter and the isolated half-bridge DC/DC converter, respectively, is an example of a suitable operating condition of the converter at 100% output power in a steady state. Similarly, intersection 906b of curves 902b and 904b for the AC/DC converter and the isolated half-bridge DC/DC converter, respectively, is an example of a suitable operating condition of the converter at 66% output power in a steady state. Similarly, intersection 906c of curves 902c and 904c for the AC/DC converter and the isolated half-bridge DC/DC converter, respectively, is an example of a suitable operating condition of the converter in a steady state.

In some implementations, it can be desirable to limit the switching frequency. Line 908 indicates an example limiting value for the switching frequency. If a desired operating point (e.g. operating point 906c of FIG. 9) is above a limiting value for the switching frequency (e.g. line 908 of FIG. 9), then the AC/DC converter and isolated half-bridge DC/DC converter can be operated at or below the limit for the switching frequency (e.g. line 908) using a pulse-skipping mode or a burst mode of operation to achieve a desired output. Region 910 above line 908 is referred to in the present application as a pulse-skipping or burst mode region. When a desired operating point lies in region 910, the AC/DC converter and isolated half-bridge DC/DC converter may be operated in a pulse-skipping mode or a burst mode of operation. Operation in a pulse-skipping mode or a burst mode of operation may be suitable for light loads, for example.

Figure 10:
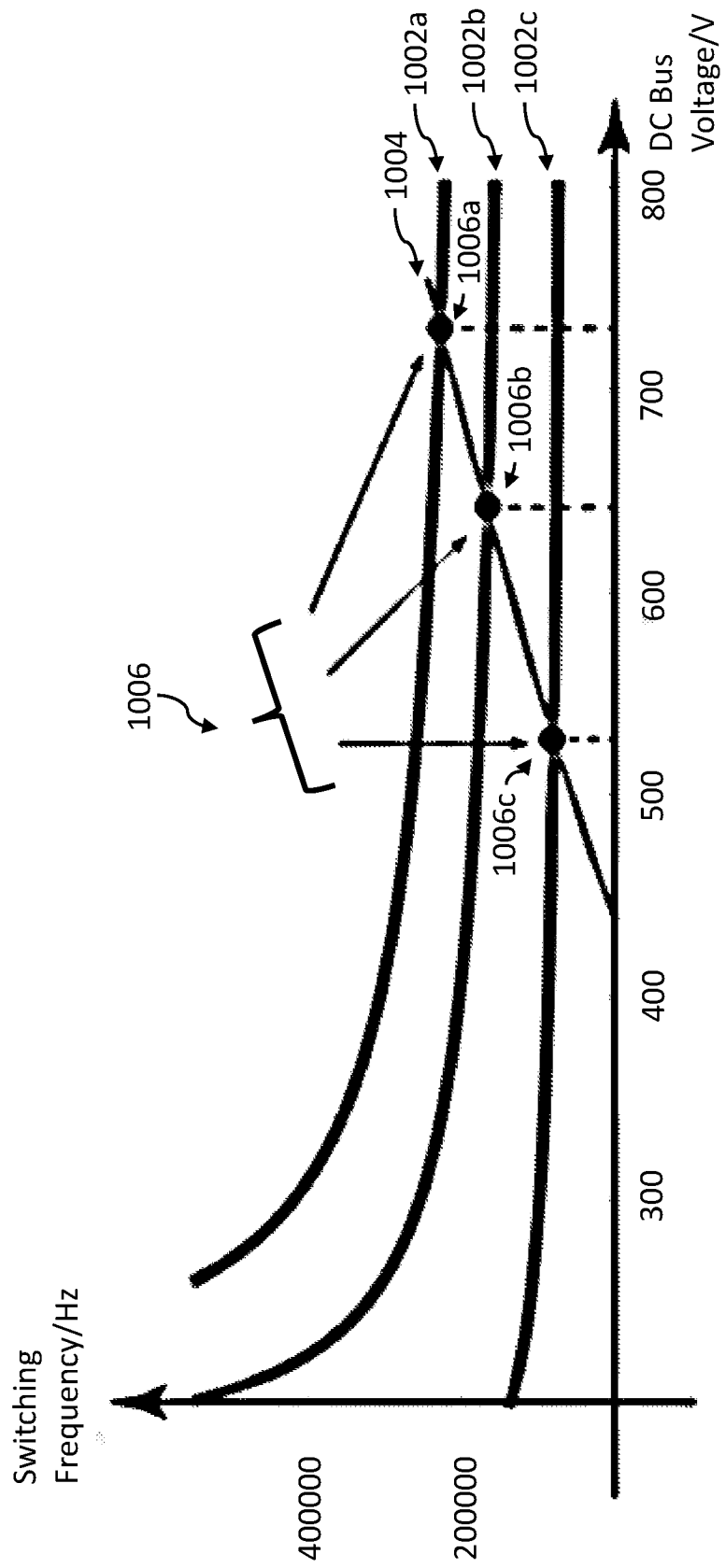
FIG. 10 is a graph illustrating example curves of switching frequency versus DC bus voltage for an AC/DC converter and an isolated half-bridge DC/DC converter, regulating a fixed output voltage at a fixed load for different AC input voltages, according the present disclosure.

FIG. 10 is a graph illustrating example curves of switching frequency versus DC bus voltage for an AC/DC converter and an isolated half-bridge DC/DC converter, regulating a fixed output voltage at a fixed load for different AC input voltages, according the present disclosure. Curves 1002a, 1002b, and 1002c show a variation of switching frequency with DC bus voltage for the AC/DC converter at high line input, nominal line input, and low line input, respectively. Curve 1004 shows a variation of switching frequency with DC bus voltage for the isolated half-bridge DC/DC converter.

Curve 1004 intersects curves 1002a, 1002b, and 1002c at intersections 1006a, 1006b, and 1006c respectively (collectively referred to as intersections 1006). Intersection 1006a of curves 1002a and 1004 for the AC/DC converter and the isolated half-bridge DC/DC converter, respectively, is an example of a suitable operating condition of the converter at high line input in a steady state. Similarly, intersection 1006b of curves 1002b and 1004 for the AC/DC converter and the isolated half-bridge DC/DC converter, respectively, is an example of a suitable operating condition of the converter at nominal line input in a steady state. Similarly, intersection 1006c of curves 1002c and 1004 for the AC/DC converter and the isolated half-bridge DC/DC converter, respectively, is an example of a suitable operating condition of the converter at low line input in a steady state.

Advantages of one or more implementations of the systems and methods described in the present application include the following: a) a single-stage AC/DC converter that can achieve near-unity power factor and tightly-regulated output voltage and current, simultaneously; b) a single-stage AC/DC converter that can achieve ZVS for a wide range of input voltage and load conditions, and with improved efficiency and EMI characteristics; c) a single-stage AC/DC converter that provides isolated output for a load; d) a single-stage AC/DC converter that can achieve high performance over a wide range of input voltage conditions (for example, universal input) by using a relay to vary boost inductance; e) a control method for a single-stage AC/DC converter, in which the control method modulates a switching frequency while maintaining a constant duty cycle; f) a control method that is applicable to a variety of half-bridge single-stage AC/DC converters each with a different respective DC/DC topology; g) a control method for a single-stage AC/DC converter that operates in DCM (and optionally with a single feedback); h) a control method for a single-stage AC/DC converter that operates at 50% duty cycle, and can simplify gate drive circuitry, and reduce a cost and a real estate of a printed circuit board (PCB) implementation.

The systems and methods described in the present application can have a variety of practical uses including single-phase, single-stage AC/DC and DC/DC conversion. Examples include a battery charger, a LED (light-emitting diode) driver circuit, a power supply, a UPS, a telecom rectifier, and a data center power supply. A bidirectional version of the technology described in the present application can be used as a solar inverter/charger, for example.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). In another implementation, the present subject matter may be implemented via embedded software and/or firmware and microcontrollers. Those of skill in the art will recognize that many of the methods or algorithms set out herein may employ additional acts, may omit some acts, and/or may execute acts in a different order than specified.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet, including U.S. Provisional Patent Application No. 62/734,595 filed Sep. 21, 2018, are incorporated herein by reference, in their entirety.

What is claimed is:

1. An apparatus comprising:
    a transformer comprising a primary winding and a secondary winding, the primary winding comprising a first end and a second end of the primary winding, and the secondary winding comprising a first end and a second end of the secondary winding;
    a first AC voltage source input connectable to a first AC input line;
    a second AC voltage source input connectable to a second AC input line;
    a first inductor connected between the first AC voltage source input and a central node;
    a first switch connected between the central node and a first rail node, the first rail node connected to the second end of the primary winding;
    a first diode oriented to pass current from the first rail node to the central node;
    a second switch connected between the central node and a second rail node;
    a second diode oriented to pass current from the central node to the second rail node;
    a first input rectifier connected between the first rail node and the second AC voltage source input and oriented to pass current from the first rail node to the second AC voltage source input;
    a second input rectifier connected between the second rail node and the second AC voltage source input and oriented to pass current from the second AC voltage source input to the second rail node;
    a second inductor connected between the central node and the first end of the primary winding of the transformer;
    a first capacitor connected between the second rail node and the second end of the primary winding of the transformer; and
    an output rectifier circuit connected between the secondary winding of the transformer and a load, wherein, in operation, the apparatus delivers a DC current to the load via the output rectifier circuit.

2. The apparatus of claim 1, further comprising a second capacitor connected between the first rail node and the second end of the primary winding of the transformer.

3. The apparatus of claim 1 wherein the output rectifier circuit comprises:
    a first output rectifier connected between the first end of the secondary winding of the transformer and a third rail node, and oriented to pass current from the first end of the secondary winding of the transformer to the third rail node; and
    a second output rectifier connected between the second end of the secondary winding of the transformer and the third rail node, and oriented to pass current from the second end of the secondary winding of the transformer to the third rail node, wherein, in operation, the apparatus delivers the DC current to the load via the third rail node.

4. The apparatus of claim 3 wherein at least one of the first input rectifier, the second input rectifier, the first output rectifier, and the second output rectifier comprises one of a diode or a controllable switch.

5. The apparatus of claim 3 wherein the transformer is a center-tapped transformer.

6. The apparatus of claim 1 wherein the first diode is a body diode of the first switch, and the second diode is a body diode of the second switch.

7. The apparatus of claim 1 wherein the first inductor comprises a variable inductor having a selectively variable inductance.

8. The apparatus of claim 7 wherein the variable inductor comprises two inductors, and the apparatus further comprises:

a first inductor switching circuit operatively coupled to the two inductors of the variable inductor, the first inductor switching circuit which in operation selectively couples the two inductors in a parallel configuration or a series configuration to provide two different levels of inductance for the variable inductor.

9. The apparatus of claim 1 wherein the second inductor comprises a leakage inductance of the primary winding of the transformer.

10. The apparatus of claim 1 wherein the first switch and the second switch comprise MOSFETs.

11. The apparatus of claim 1, further comprising:
a control system operatively coupled to the first switch and the second switch, the control system which in operation selectively controls the first switch and the second switch by varying at least one of a respective switching frequency or a respective duty cycle of the first switch and the second switch.

12. The apparatus of claim 11 wherein the control system, in operation, selectively controls the first switch and the second switch to provide zero voltage switching (ZVS) operation.

13. The apparatus of claim 11 wherein the control system in operation receives at least one feedback signal indicative of an output of the apparatus, and selectively controls the first switch and the second switch based at least in part on the at least one received feedback signal.

14. The apparatus of claim 11 wherein the control system, in operation, selectively controls the first switch and the second switch to cause the first inductor to operate in a Discontinuous Conduction Mode (DCM).

15. The apparatus of claim 1 wherein the first capacitor is a storage capacitor that forms a primary side DC bus between the first rail node and the second rail node.

16. The apparatus of claim 2 wherein the first capacitor and the second capacitor are storage capacitors that form a primary side DC bus between the first rail node and the second rail node.

17. The apparatus of claim 1 wherein, in operation, the first switch and the second switch maintain a constant duty cycle of approximately 0.5 (50%), and the apparatus varies the DC current by modulating a switching frequency of the first switch and the second switch.

18. The apparatus of claim 7 wherein, in operation, an inductance of the selectively variable inductance is based at least in part on a voltage of an AC input line.

19. The apparatus of claim 11 wherein, in operation, the control system selectively controls the first switch and the second switch to maintain a constant duty cycle of approximately 0.5 (50%) for each of the first switch and the second switch, and selectively controls the first switch and the second switch to vary the DC current by modulating a switching frequency of the first switch and the second switch.

20. A method of controlling a single-stage AC/DC converter, the AC/DC converter comprising a boost PFC AC/DC converter and a half-bridge DC/DC converter, the boost PFC AC/DC converter and the half-bridge DC/DC converter sharing a pair of switches, wherein a boost inductor of the boost PFC AC/DC converter has a selectively variable inductance, the method comprising:
modulating a respective switching frequency of each of the pair of switches; and
selectively varying the inductance of the boost inductor based at least in part on a voltage of an AC input line.

21. A method of controlling a single-stage AC/DC converter, the AC/DC converter comprising a boost PFC AC/DC converter and a half-bridge DC/DC converter, the boost PFC AC/DC converter and the half-bridge DC/DC converter sharing a pair of switches, wherein a boost inductor of the boost PFC AC/DC converter comprises two inductors, and the boost PFC AC/DC converter comprises a boost inductor switching circuit operatively coupled to the two inductors, the method comprising:
modulating a respective switching frequency of each of the pair of switches; and
controlling the boost inductor switching circuit to cause the boost inductor switching circuit to couple the two inductors in a parallel configuration or a series configuration based at least in part on a voltage of an AC input line connected to the AC/DC converter.

* * * * *